United States Patent
Suzuki et al.

(10) Patent No.: US 11,586,703 B2
(45) Date of Patent: Feb. 21, 2023

(54) FEATURE TRANSFORMATION APPARATUS AND METHOD, AND RECORDING MEDIUM

(71) Applicant: NEC Corporation, Tokyo (JP)

(72) Inventors: Ryota Suzuki, Tokyo (JP); Shingo Takahashi, Tokyo (JP); Murtuza Petladwala, Tokyo (JP); Shigeru Koumoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 393 days.

(21) Appl. No.: 16/965,742

(22) PCT Filed: Feb. 8, 2018

(86) PCT No.: PCT/JP2018/004437
§ 371 (c)(1),
(2) Date: Jul. 29, 2020

(87) PCT Pub. No.: WO2019/155579
PCT Pub. Date: Aug. 15, 2019

(65) Prior Publication Data
US 2021/0034695 A1 Feb. 4, 2021

(51) Int. Cl.
*G06F 17/14* (2006.01)
*G06F 17/16* (2006.01)

(52) U.S. Cl.
CPC ............ *G06F 17/14* (2013.01); *G06F 17/16* (2013.01)

(58) Field of Classification Search
CPC .......... G06F 17/14; G06F 17/16; G06F 17/18; G06Q 50/06; G06N 5/003; G06N 7/005

USPC ........................................................ 708/400
See application file for complete search history.

(56) References Cited

U.S. PATENT DOCUMENTS

| | | | |
|---|---|---|---|
| 6,341,283 B1 | 1/2002 | Yamakawa et al. | |
| 2015/0046135 A1 | 2/2015 | Ito et al. | |
| 2021/0056444 A1* | 2/2021 | Shimazu | G06N 7/005 |

FOREIGN PATENT DOCUMENTS

| | | |
|---|---|---|
| JP | H11-338855 A | 12/1999 |
| JP | 2007-058603 A | 3/2007 |
| JP | 2013-210755 A | 10/2013 |
| JP | 5668204 B2 | 2/2015 |
| JP | 2015-228083 A | 12/2015 |
| WO | 2015/057356 A1 | 4/2015 |

OTHER PUBLICATIONS

Ian En-Hsu Yen, Wei-Cheng Lee, Sung-En Chang, Arun Sai Suggala, Shou-De Lin, Pradeep Ravikumar, "Latent Feature Lasso" Proceedings of the 34 th International Conference on Machine Learning, Sydney, Australia, PMLR 70:3949-3957, 2017.
International Search Report for PCT Application No. PCT/JP2018/004437, dated Apr. 24, 2018.

* cited by examiner

*Primary Examiner* — Tan V Mai
(74) *Attorney, Agent, or Firm* — Sughrue Mion, PLLC

(57) ABSTRACT

A feature transformation apparatus includes at least a combination storage part that stores a combination with respect to a set of features, wherein data is approximately represented as a sum of the combination of the features; and a transformation part that transforms at least the combination so as not to change the sum of the combination of the set of features.

20 Claims, 18 Drawing Sheets

FIG. 2

| | | Feature Dimension | | | | | |
|---|---|---|---|---|---|---|---|
| | | 1 | 2 | 3 | 4 | 5 | ... D |
| Features | $a_1$ | 0.2 | 0.5 | 2.1 | 3.1 | 2.5 | ... |
| | $a_2$ | 1 | 2 | 1 | 4 | 3 | ... |
| | $a_3$ | 0 | 0 | 1 | 0 | 1 | ... |
| | ⋮ | ⋮ | ⋮ | ⋮ | ⋮ | ⋮ | ⋮ |
| | $a_K$ | ... | ... | ... | ... | ... | ... |

FIG. 3

| | FEATURES | | | |
|---|---|---|---|---|
| | 1 | 2 | 3 ... | K |
| 1 | 0 | 1 | 1 | ... |
| 2 | 0 | 1 | 1 | ... |
| 3 | 0 | 1 | 0 | ... |
| 4 | 1 | 1 | 0 | ... |
| 5 | 1 | 1 | 0 | ... |
| ⋮ | ⋮ | ⋮ | ⋮ | |
| N | ... | ... | ... | ... |

DATA (rows), 102, 112

| TRANSFORMATION TYPE | PARAMETER | TRANSFORMATION MATRIX | TRANSFORMATION OF COMBINATION | TRANSFORMATION OF FEATURE |
|---|---|---|---|---|
| Regular | REGULAR MATRIX U | U | $Z' \leftarrow ZU$ | $A' \leftarrow U^{-1}A$ |
| Unimoduler | UNIMODULAR MATRIX U | U | $Z' \leftarrow ZU$ | $A' \leftarrow U^{-1}A$ |
| Q | $i$ | $Q_i$ | $z'_i \leftarrow -z_i$ | $a'_i \leftarrow -a_i$ |
| R | $i, j$ | $R_{i,j}$ | $z'_j \leftarrow z_i + z_j$ | $a'_i \leftarrow a_i - a_j$ |
| QR | $i, j$ | $Q_j R_{i,j}$ | $z'_j \leftarrow z_i - z_j$ | $a'_i \leftarrow a_i + a_j$<br>$a'_j \leftarrow -a_j$ |
| QRQ | $i, j$ | $Q_j R_{i,j} Q_j$ | $z'_j \leftarrow -z_i + z_j$ | $a'_i \leftarrow a_i + a_j$ |
| QRR | $i, j, k$ | $Q_k R_{i,k} R_{jk}$ | $z'_k \leftarrow z_i + z_j - z_k$ | $a'_i \leftarrow a_i + a_k$<br>$a'_j \leftarrow a_j + a_k$<br>$a'_k \leftarrow -a_k$ |

FIG. 7

| TRANSFORMATION TYPE | PARAMETER | TRANSFORM COMBINATION |
|---|---|---|
| clip | N/A | $z'_{ij} = \begin{cases} 1, & z_{ij} \geq 1 \\ 0, & z_{ij} \leq 0 \end{cases}$ |
| parity | N/A | $z'_{ij} \leftarrow z_{ij} \bmod 2$ |
| R-parity | $i, j$ | $z'_j \leftarrow z_i \oplus z_j$ |

| DATA | POSSIBILITY 1 | POSSIBILITY 2 |
|---|---|---|
| 11 | 13 | 15 |
| 12 | 13 + 14 | 16 |

FEATURE TRANSFORMATION APPARATUS AND METHOD, AND RECORDING MEDIUM

This application is a National Stage Entry of PCT/JP2018/004437 filed on Feb. 8, 2018, the contents of all of which are incorporated herein by reference in their entirety.

FIELD

The present invention relates to a feature transformation apparatus and method and recording medium.

Various methods have been proposed for factorizing data into the sum of a combination of a plurality of features. For instance, Patent Literature 1 discloses an electric equipment estimation apparatus that acquires time-series data on a total value of current consumption of a plurality of electrical apparatuses, and derives a model parameter $W^{(m)}$ for modeling an operating status of the plurality of electrical apparatuses using a Factorial Hidden Markov Model (Factorial FHMM) as a probabilistic model based on the time-series data.

Further, Non-Patent Literature 1 proposes a method for representing data as a combination of latent features using a Latent Feature Model (LFM) and further extracting a feature common to a plurality of images by inferring a latent feature.

Both the factorial HMM in Patent Literature 1 and the Latent Feature Model (LFM) in Non-Patent Literature 1 are methods for extracting a latent feature of observed data by factorizing the data into a sum of a feature combination.

For instance, in an equation for explaining model parameter estimation in the factorial HMM in Patent Literature 1,

[Math. 2]

$$\mu_t = \sum_{m=1}^{M} W^{(m)} S_t^{(m)} \quad (4)$$

an observation average $\mu_t$ is an approximation of observed data $Y_t$ in the sense that it is a stochastic average of the observed data, and the equation describes the approximation $\mu_t$ with a combination of parameters $W^{(m)}$ according to a hidden state $S_t^{(m)}$.

That is, factorial HMM approximately factorizes the data $Y_t$ as the sum of a combination of features $W^{(m)}$ in Patent Literature 1.

In Section 2 of Non-Patent Literature 1, the following equation explaining the Latent Feature Model (LFM) is described.

$$x = W^T z + e$$

where $x \in R^D$ is an observed random vector,
$z \in \{0, 1\}^K$ is a binary vector (binary feature incidence vector indicating the presence or absence of K features,
$W \in R^{K \times D}$ is an unknown matrix of K latent features of dimension D. Note that the superscript T of W is a transpose operator, and
$e \in R^D$ is an unknown noise vector.

In patent Literature 1, the data x is approximately factorized into a sum of a combination of K row vectors (K latent features) of W in the LFM. Non-Patent Literature 1 describes, as identifiability, a non-uniqueness problem that a method to represent data by a sum of a combination of features is not unique. Non-Patent Literature 1 indicates sufficient conditions for identifiability (i.e., a method to represent data by a sum of a combination of features is unique) in Theorem 4. Theorems 4 and 5 in Non-Patent Literature 1 are as follows.

With respect to two parameters $(Z^*, W^*)$, when $ZW=Z^*W^*$ and $(Z, W) \neq (Z^*, W^*)$, it is impossible to recover the true parameters $(Z^*, W^*)$ from $\Theta^*=Z^*W^*$. The following theorem introduces conditions that ensure uniqueness of the factorization $\Theta^*=Z^*W^*$.

Theorem 4

Let $\Theta^*=Z^*W^*$ be of rank K. If
1. $Z^*: N \times K$ and $W^*: K \times D$ are both of rank K, and
2. span $(Z^*) \cap \{0, 1\}^N \setminus \{0\} = \{Z^*_{:,j}\}_{j=1}^K$.

Then for any rank-K matrices Z: $N \times K$ and W: $K \times D$, $ZW=\Theta^*$ implies $\{Z_{:,j}\}_{j \in S}=\{Z^*_{:,j}\}_{j=1}^K$ and $\{W_{j,:}\}_{j \in S}=\{W^*_{j,:}\}_{j=1}^K$ Theorem 5 in Non-Patent Literature 1 indicates that the approximation error of an estimation algorithm expressed by Exp. (21) in Non-Patent Literature 1 can be reduced to arbitrarily small.

$$\min_{c \in R_+^K, W \in R^{K \times D}} \frac{1}{2N} \|X - Z\text{diag}(c)W\|_F^2 + \lambda \|c\|_1 \quad \text{Exp. (20)}$$

s.t. $\|W\|_F^2 \leq R$
$\text{diag}_{kk}(c) = \sqrt{c_k}$ $$\min_{c \in R_+^K, W \in R^{K \times D}} \|c\|_1 \quad \text{Exp. (21)}$$

s.t. $ZD(c)W = X, \|W\|_F^2 \leq R$

One can choose an arbitrarily small $\lambda$ $\lambda \leq \bar{\lambda}$ for some $\bar{\lambda} > 0$ and solve Exp. (20) of Non-Patent Literature 1 to obtain a solution (c, W) of Exp. (21), which satisfies the following Theorem 5.

Theorem 5

Let (c, W) be a solution to Exp. (20) of Non-Patent Literature 1, and (ZS, WS) be columns of Z and rows of W corresponding to the set of non-zero indexes S of c respectively. If the conditions in Theorem 4 hold and WS has full row-rank then $\{Z_{:,j}\}_{j \in S} = \{Z^*_{:,j}\}^{K_j=1}, \{W_{j,:}\}_{j \in S} = \{W^*_{j,:}\}^{K_j=1}$ Generally speaking, its addition to Patent Literature 1 and Non-Patent Literature 1 described above, the factorial HMM and the latent feature model are techniques for approximately factorizing observed data as the sum of a combination of features.

[Patent Literature 1]
Japanese Patent No. 5668204
[Non-Patent Literature 1]
Ian En-Hsu Yen, Wei-Cheng Lee, Sung-En Chang, Arun Sai Suggala Shou-De Lin, Pradeep Ravikumar, "Latent Feature Lasso," Proceedings of the 34th International Conference on Machine Learning, PMLR 70:3949-3957, 2017.

SUMMARY

However, in the factorial HMM and the latent feature model described above, or more generally in a method for approximately factorizing data as a sum of a combination of features, how to factorize is not unique.

When the related technologies such as Patent Literature 1 and Non-Patent Literature 1 are used, a combination of features cannot be accurately estimated when data includes the problem of non-uniqueness (details be described later).

Therefore, it is an object of example embodiments disclosed herein to provide a feature transformation apparatus, feature transformation method, and recording medium (program) capable of facilitating the acquisition of an accurate combination of features of data even when the sum (factorization) of a combination of features, of the data is not unique.

According to an aspect of the present invention, there is provided a feature transformation apparatus comprising: at least a combination storage part that stores a combination with respect to a set of features, wherein data is approximately represented as a sum of the combination of the features; and a transformation part that transforms at least the combination so as not to change the sum of the combination of the set of features.

According to an aspect of the present invention, there is provided a feature transformation method by a computer, the method comprising:

accessing a combination storage part that stores a combination with respect to a set of features, wherein data is approximately represented as a sum of the combination of the features; and transforming at least the combination so as not to change the sum of the combination of the set of features.

According to an aspect of the present invention, there is provided a program that causes a computer comprising at least a combination storage part that stores a combination with respect to a set of features, wherein data is approximately represented as a sum of the combination of the features to execute processing comprising transforming at least the combination so as not to change the sum of the combination of the set of features, and a recording medium storing the program (for instance non-transitory computer-readable medium semiconductor memory such as RAM (Random Access Memory) and ROM (Read-Only Memory)), USB (Universal Serial Bus) memory, HDD (Hard Disk Drive), CD (Compact Disc), DVD (Digital Versatile Disc), etc.).

According to the present invention, it becomes possible to facilitate the acquisition of an accurate combination of features for data even if the sum of a combination of features of the data is not unique.

BRIEF DESCRIPTION OF THE DRAWINGS

FIG. 2 is a diagram schematically showing an example of a feature storage part according to the first example embodiment of the present invention.

FIG. 3 is a diagram schematically showing an example of a combination storage part according to the first example embodiment of the present invention.

FIG. 6 is a drawing showing a list of transformation types according to an example embodiment of the present invention.

FIG. 7 is a drawing showing a list of transformation types according to an example embodiment of the present invention.

FIG. 15 is a diagram explaining unidentifiability.

DETAILED DESCRIPTION

Figure 1:
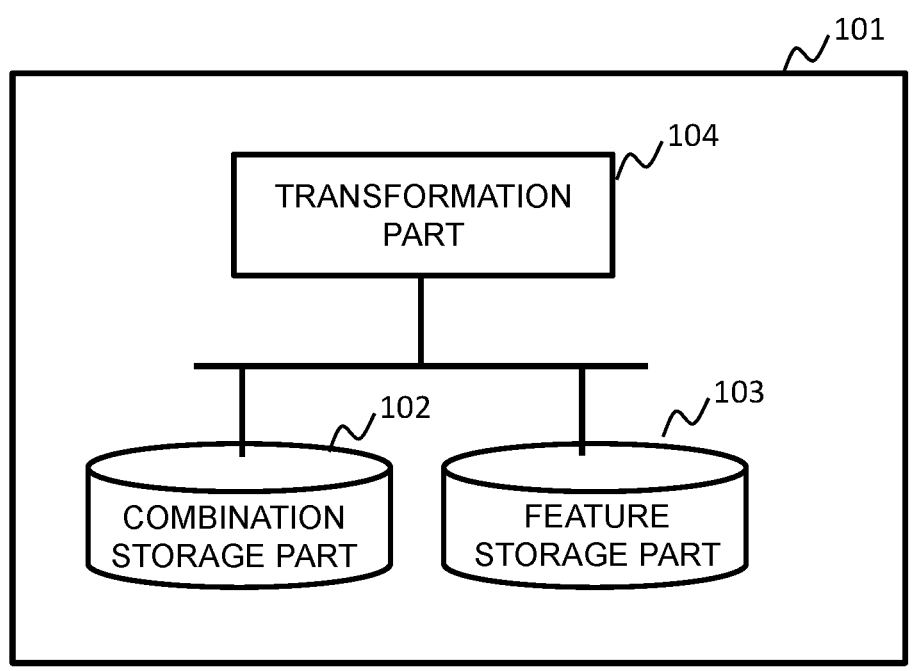
FIG. 1 is a diagram illustrating the configuration of a first example embodiment of the present invention.

Example embodiments of the present invention will be described. First, with respect to a method for approximately factorizing data as a sum of a combination of features such a as factorial HMM and a latent feature model, the following describes with reference to FIG. 15 why estimation cannot be performed accurately when such factorization is not unique.

Figure 15:
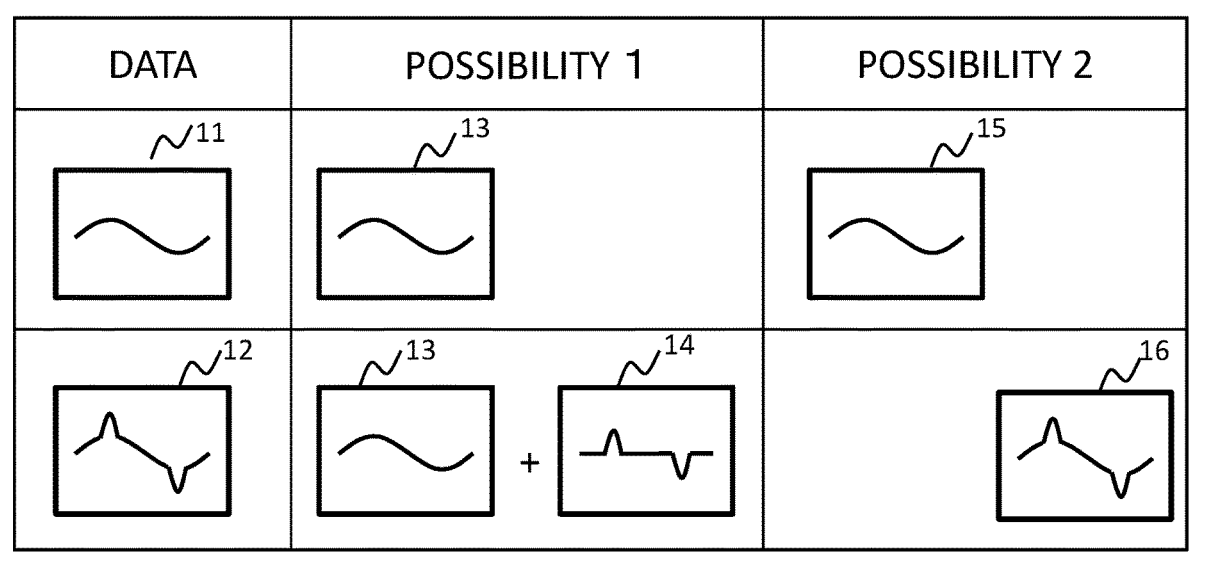

FIG. 15 illustrates two cases of factorizing two sets of data 11 and 12 into a sum of a combination of features. Here, the data 11 and 12 and features 13 to 16 in FIG. 15 schematically illustrate data or features (feature values) expressed as vector quantities $v+[v_1, \ldots, v_n]$ (i+1, ..., n; n is a predetermined positive integer) by plotting i on a horizontal axis and a value $v_i$ of a component i on a vertical axis for each component i of v. The data 11 and 12 and the features 13 to 16 may be time-series data of feature values (the horizontal axis may be a time axis) extracted from time-series data of a signal obtained by a feature extraction apparatus (not shown in the drawing) from a sensor (measurement apparatus).

In both possibilities 1 and 2 the two items of data 11 and 12 are factorized into sums of combinations of two features (waveforms (the features) 13 and 14 in the possibility 1 and waveforms (the features) 15 and 16 in the possibility 2). Note that, in FIG. 15, the features 13 and 15 have the same waveform pattern as that of the data 11 and the feature 16 has the same waveform pattern as that of the data 12 in order to simplify the explanation.

In the possibility 1, the data 11 is represented as the waveform (feature) 13 and the data 12 as the sum of the Waveforms (features) 13 and 14.

In the possibility 2, the data 11 is represented as the waveform (feature) 15 and the data 12 as the waveform (feature) 16.

The example of FIG. 15 has two factorization possibilities 1 and 2 when the data 11 and 12 are factorized into a sum of a combination of features.

That is, how the data 11 and 12 are factorized is not unique, i.e the data can be factorized into a sum of a combination of features in a plurality of ways. In this case, it is difficult to choose a right feature combination from a plurality of possibilities.

In Patent Literature 1, in order to avoid a part of this kind of non-uniqueness problem, identical apparatus determination means selects combinations that always satisfy a necessary condition as identical apparatus candidates in order to avoid a part of the non-uniqueness problem and, out of the selected identical apparatus candidates, determine a combination that has satisfied a hint condition a predetermined number of times or more to be an identical apparatus.

The non-uniqueness problem described above, however, cannot be solved by identical apparatus determination.

Figure 16:
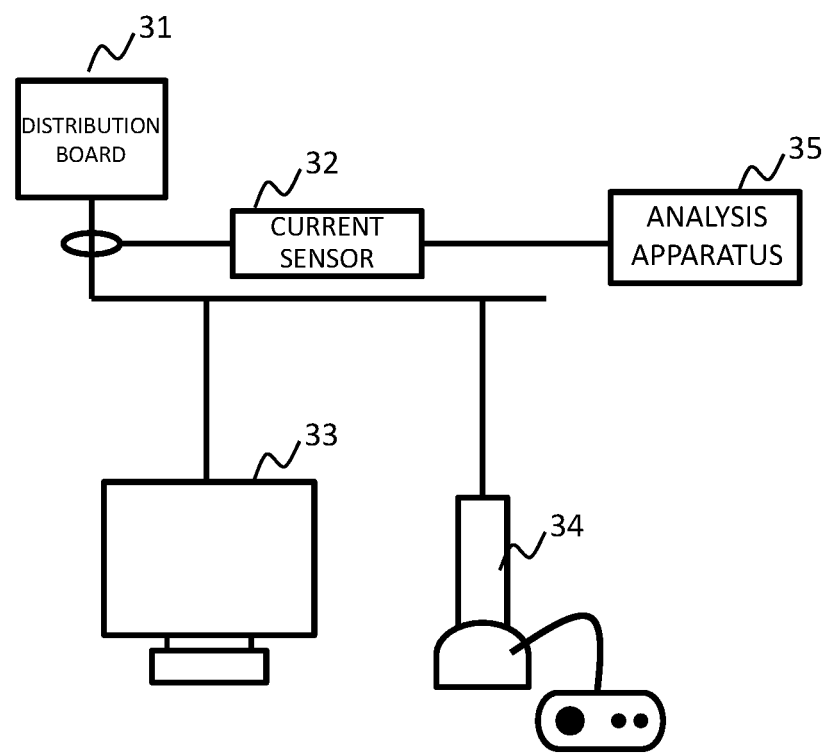
FIG. 16 is a diagram explaining unidentifiability.

The following demonstrates this with reference to an example in FIG. 16, in addition to FIG. 15. In FIG. 16, a television 33 and a video game console 34 are supplied with the power from a distribution board 31. Further, a current sensor 32 is installed on the distribution board 31. An analysis apparatus 35 analyzes a current waveform from the current sensor 32, separates the waveform into a current waveform of each apparatus, and estimates the operating state. Note that the analysis apparatus 35 may be provided in a HEMS (Home Energy Management System) gateway or on a cloud server.

The following assumes that the data 11 and 12 in FIG. 15 are measurement data (current waveforms) measured at two different times by the current sensor 32 installed on the distribution board 31 in FIG. 16. Further, it is assumed that a plurality of sets of data, each equivalent to the data 11 and 12, have been measured, although not shown in FIG. 15.

In FIG. 15, when the analysis apparatus 35 estimates a parameter $W^{(m)}$ (i.e., a current waveform $W^{(1)}$ of the television 33 and a current waveform $W^{(2)}$ of the video game console 34) from the data 11 and 12 using, for example, the factorial HMM, the parameter estimation result will be either the possibility 1 or 2 described above due to the non-uniqueness problem above.

For example, in the possibility 1, the current waveform $W^{(1)}$ of the television 33 is estimated to be one of the waveforms 13 and 14, and the current waveform $W^{(2)}$ of the video game console 34 is estimated to be the other.

Further, in the possibility 2, the current waveform $W^{(1)}$ of the television 33 is estimated to be one of the waveforms 15 and 16, and the current waveform of the video game console 34 is estimated to be the other.

Here, of the two cases, it is assumed that the possibility 1 is actually correct; the waveform 13 is the current waveform $W^{(1)}$ of the television 33 and the waveform 14 is the current waveform $W^{(2)}$ of the video game console 34.

That is, the data 11 represents the current waveform of a situation in which the television 33 is powered ON, and the data 12 represents the current waveform of a situation in which both the television 33 and the video game console 34 are powered ON. In FIG. 15, the data 11 indicating that only the television 33 is ON and the data 12 indicating both the television 33 and the video game console 34 are ON are observed, however, data indicating that only the video game console 34 is ON is not observed. This indicates a situation in which the video game console 34 must be connected to a television when used and therefore the power of the television 33 is ON when the video game console 34 is turned ON.

In this situation, for example, let's assume that the result of parameter estimation using the factorial HMM converges to the possibility 2, the current waveform $W^{(1)}$ of the television 33 is estimated to be the waveforms 15, and the current waveform $W^{(2)}$ of the video game console 34 is estimated to be the waveform 16.

In this case, the estimated current waveform (the waveform 16) of the video game console 34 is greatly different from the actual value (the waveform 14).

Further, in the situation of the possibility 2 to which the estimation converges, the waveform (estimated waveform) 15 of the television 33 and the waveform (estimated waveform) 16 of the video game console 34 are never turned ON simultaneously in the estimation result.

Further, many cases are observed where, when the waveform (estimated waveform) 15 of the television 33 or the waveform (estimated waveform) 16 of the video game console 34 changes from ON to OFF, the other changes from OFF to ON. Therefore, if the identical apparatus determination of Patent Literature 1 is performed in this situation, the result will correspond to the situation of the case B in Patent Literature 1.

Figure 17:
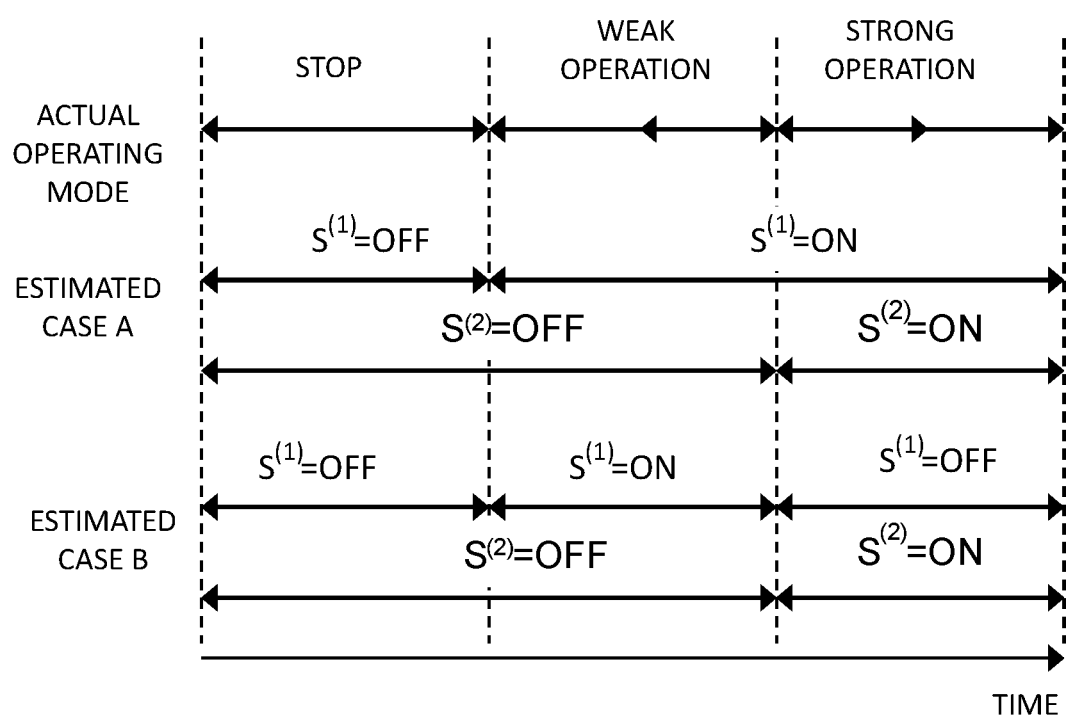
FIG. 17 is a diagram explaining unidentifiability (taken from FIG. 16 of Patent Literature 1).

Patent Literature 1 describes that parameter estimation of estimating an electrical apparatus having three states (a fan with three operating modes: stop mode, operation mode, and strong operation mode) under restricted conditions of two states (ON and OFF) converges to either the case A or B shown in FIG. 17. The case A (necessary condition: when a state $S^{(2)}$=ON, always a state $S^{(1)}$=ON; hint condition: when the state $S^{(1)}$ transitions from ON to OFF, there may be a case in which the state $S^{(2)}$ transitions from ON to OFF at the same time; hint condition when the state $S^{(1)}$ transitions from OFF to ON, there may be a case in which the state $S^{(2)}$ transitions from OFF to ON at the same time.)

The case B (necessary condition: when the state $S^{(1)}$=ON, always the state $S^{(2)}$=OFF; necessary condition: when the stale $S^{(2)}$=ON, always the state $S^{(1)}$=OFF; hint condition: when the state $S^{(1)}$ transitions from ON to OFF, there may be a case in which the state $S^{(2)}$ transitions from OFF to ON at the same time; hint condition: when the state $S^{(1)}$ transitions from OFF to ON, there may be a case in which the slate $S^{(2)}$ transitions from ON to OFF at the same time.) By evaluating these conditions, it is possible to estimate that states $S^{(1)}$ and $S^{(2)}$ are caused by the same apparatus. In the possibility 2 in FIG. 15, time-series waveform data 11 and 12 at different times are estimated to be the waveforms 15 and 16, respectively, and this may be said to correspond to $S^{(1)}$ and $S^{(2)}$ of the case B in FIG. 17.

As a result, if the estimated waveform 15 of the television 33 or the estimated waveform 16 of the video game console 34 in FIG. 16 changes from ON to OFF and the other changes from OFF to ON, the identical apparatus determination means of Patent Literature 1 will determine that the television 33 and the video game console 34 are the same apparatus in the case B despite the fact that they are different apparatuses.

In addition, by applying the identical apparatus determination means of Patent Literature 1, there is a case in which one cannot get to know that the estimated result of the possibility 2 (FIG. 15) is actually incorrect or one cannot obtain the possibility 1 which is an actual correct answer.

As described above, applying the identical apparatus determination means of Patent Literature 1 can be a cause to degrade the accuracy of the estimation result, because it not only is unable to select the correct case from a plurality of cases for factorization of feature combinations, but may also determine that different apparatuses are the same one.

Non-Patent Literature 1 refers to the above described non-uniqueness problem as identifiability. Non-Patent Literature 1 demonstrates a sufficient condition(s) for identifiability (i.e., a manner to represent data as a sum of a combination of features is unique) in Theorem 4. Further, Theorem 5 in Non-Patent Literature 1 indicates that the approximation error of the estimation algorithm expressed by Exp. (21) in Non-Patent Literature 1 can be reduced to arbitrarily small. That is, the method for estimating features using the LFM proposed in Non-Patent Literature 1 demonstrates that accurate factorization is possible only when identifiability holds (i.e., when a manner to represent data as a sum of a combination of features is unique).

As described with reference to FIG. 15, however, in practical applications, identifiability (uniqueness) often does not hold as in the above described cases 1 and 2.

Therefore, the conditions in Theorem 4 in Non-Patent Literature 1 do not hold. The estimation algorithm expressed by Exp. (21) of Non-Patent Literature 1 cannot always obtain accurate factorization. Rather, since there are a plurality of possible cases of factorization, it may be said that a possibility to obtain a correct one from these factorization cases becomes lower. Several example embodiments will be described below.

Figure 18:
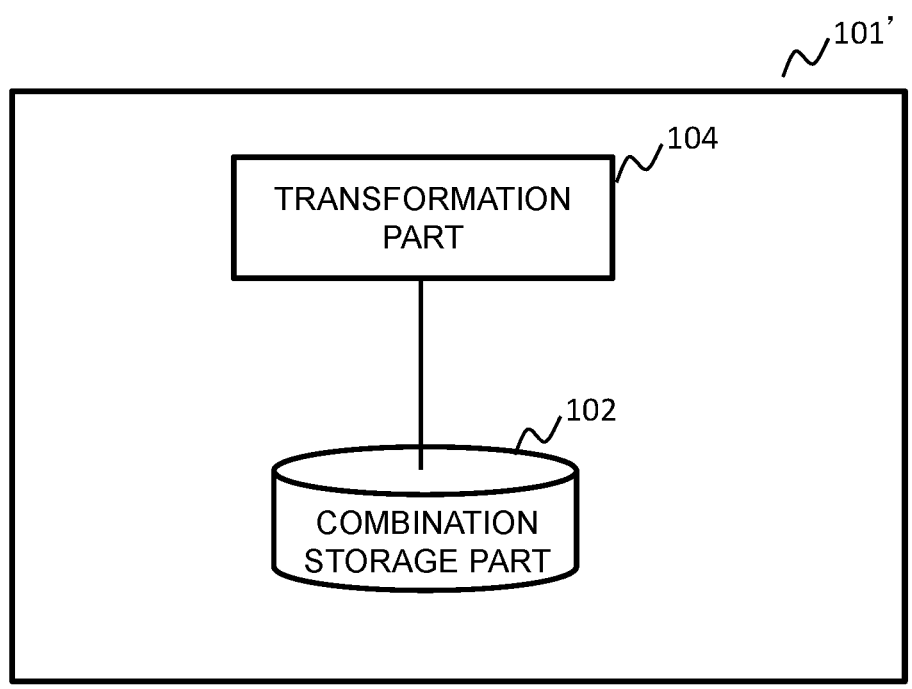
FIG. 18 is a diagram illustrating a basic embodiment of the present invention.

FIG. 18 is a diagram illustrating a mode of the present invention. Referring to FIG. 18, a feature transformation apparatus 101' includes at least a combination storage part 102 that stores a combination with respect to a set of features approximately representing data as a sum of the combination of the features, and a transformation part 104 that transforms at least the combination so as not to change the sum of the combination of the set of features. In an embodiment of the present invention, the combination storage part 102 may be configured to hold the combination in a binary matrix (Z) format indicating whether or not each feature appears in the data, and the transformation part 104 may be configured to transform the combination by multiplying the binary matrix by a regular matrix. When the number of occurrences of a feature, timing information and the like are required rather than the value of each feature, the transformation part 104 may transform only the combination. For example, the transformation part 104 may perform the transformation to the combination (binary matrix Z), based on, for example, an optimization of an objective function using only the combination (binary matrix Z). In an embodiment of the present invention, the transformation part 104 may transform the combination (binary matrix Z) and the features (feature matrix A) without changing the sum of the combination of the feature set. The acquisition of an accurate combination of features can be facilitated even if the sum (factorization) of a combination of features of data is not unique.

Example Embodiment 1

FIG. 1 is a diagram illustrating a configuration example of a feature transformation apparatus 101 relating to a first example embodiment of the present invention. The following describes the configuration of the feature transformation apparatus 101 relating to the first example embodiment of the present invention with reference to FIG. 1. Referring to FIG. 1, the feature transformation apparatus 101 includes a combination storage part 102, a feature storage part 103, and a transformation part 104 in FIG. 1. The transformation part 104 may realize the functions thereof by having a processor connected to a memory storing a program (commands) execute the commands. The combination storage part 102 and the feature storage part 103 may be a RAM (Random Access Memory), EEPROM (Electrically Erasable Programmable Read-Only Memory). HDD (Hard Disk Drive), rewritable CD (Compact Disc) (for example CD-RW), rewritable DVD (Digital Versatile Disc) (for example DVD-RAM), etc. Although the combination storage part 102, the feature storage part 103, and the transformation part 104 are shown as an integrated unit, these may be separate units communicatively connected to each other via communication means.

The feature storage part 103 holds K features (K is an integer of two or more) as vector quantities of dimension D ($D \geq 1$). Each of the K features commonly appears in some or all of N pieces of data constituted by D-dimensional vector quantities, and these pieces of data are approximately factorized into the sum of a combination of the features.

In FIG. 1, examples of the N pieces of data are as follows.
Real vector;
Integer vector;
Binary vector (0-1 vector);
etc.

The data may be any of the following.
Voice (audio);
Mechanical vibration;
Pressure; and
Current, voltage, power.

Further, the data may be D-dimensional real vector which is obtained by vectortizing the feature values (Mel Frequency Cepstral Coefficient (MFCC), etc.) of the following.
Time domain signal waveform: or
Frequency domain spectrum.

Further, the N pieces of data may be a complex spectrum of the time domain signal waveform. In this case, it may be expressed as a real-valued vector quantity having a length D twice that of the original complex spectrum by representing a real part and an imaginary part of the complex number as real numbers.

Further, the data may be D-dimensional integer vectors in which the numbers of occurrences of observable D events (for example, the number of purchases of each product at a store, the number of visits to each page on a website, the number of occurrences of each type of error log, etc.) are arranged for each event.

Alternatively, the data may be image. In this case, it may be $D=D_1 D_2$-dimensional vectors in which luminance of each pixel in grayscale image data of size $D_1 \times D_2$ are arranged, or may be $D=3 D_1 D_2$-dimensional vectors in which color components (R, G, B) of each pixel in color image data of size $D_1 \times D_2$ are arranged.

The features of K D-dimensional vectors held in the feature storage part 103 may be held as a K×D matrix (feature matrix) in the feature storage part 103.

FIG. 2 schematically shows an example of the feature matrix 111 stored in the feature storage part 103. In FIG. 2, the feature dimension in the row direction is the dimension of feature vectors, and in this case. D ($\geq 2$). Further, the number of features in the column direction is the number of feature vectors and is K ($\geq 2$).

For example, in the rows (row vectors) of the feature matrix 111, $a_1=[0.2, 0.5, 2.1, 3.1, 2.5, \ldots]$, $a_2=[1, 2, 1, 4, 3, \ldots]$, $a_3=[0, 0, 1, 0, 1, \ldots]$, $\ldots$, $a_K=[x, y, z, \ldots]$ are stored as K D-dimensional feature vectors.

Here, the feature vectors (row vectors) may be real vectors like in $a_1$ or integer vectors like in $a_2$ in FIG. 2. Further, they may be binary vectors having 0 or 1 as components like in as. Further, in FIG. 2, the feature matrix 111 is a K×D matrix in which K feature vectors (row vectors) are arranged in the rows and is referred to as A in the present specification. Further, with respect to the feature vectors, for example, the analysis apparatus 35 in FIG. 16 may analyze measurement waveform data (lime-series data) as data, acquire time-series data of feature values, generate D-dimensional feature vectors, and store the feature matrix 111 in the feature storage part 103.

Next, factorization by features of data will be described.

The combination storage part 102 holds a combination indicating whether or not each of the K features appears in the N pieces of data. The combination storage part 102 may hold the combination in, for example, an N×K binary matrix (constituted by 0 and 1 as components) (combination matrix).

That is, the combination storage part 102 may be configured to store an N×K incident matrix that takes 1 when one of the K features appears in one of the N pieces of data and 0 when it does not. Further, for example, the analysis apparatus 35 in FIG. 16 may generate the combination matrix 112 (N×K incident matrix) in the combination storage part 102.

FIG. 3 schematically show's an example of the combination matrix 112 stored in the combination storage part 102. In FIG. 3, let a (n, k) component of the combination matrix 112 be $Z_{n,k}$, $Z_{n,k}=1$ is stored when a feature k appears in the n-th piece of data, and $Z_{n,k}=0$ is stored when the feature k does not appear in the n-th piece of data.

Hence, out of the N pieces of data, the n-th piece of data $x_n$ (D-dimensional row vectors) is approximately factorized by the following Exp. 1 into the sum of a combination of features using K feature vectors $a_k$ (k=1, . . . , K) and the N×K combination matrix Z (incident matrix) 112.

$$x_n = \sum_{k=1}^{K} Z_{n,k} a_k + \varepsilon_n \qquad \text{(Exp. 1)}$$

where $\varepsilon_n$ is a noise vector (D-dimensional vector) representing the approximation error or measurement error.

Further, when a data matrix X is defined by an N×D matrix in which data $x_n$ (n=1, . . . , N) are arranged in each row, (Exp. 1) is expressed by the matrix form of the following Exp. 2 using the combination matrix Z and the feature matrix A.

$$X=ZA+E. \qquad \text{(Exp. 2)}$$

where E is an error matrix in which error vectors $\varepsilon_n$ (n=1, . . . , N) are arranged in each row.

That is, the data matrix X (N×D matrix) is approximately factorized into the product of the combination matrix Z (N×K binary matrix) and the feature matrix A (K×D matrix).

As an approximate value of the data matrix X from the combination matrix Z and the feature matrix A.

$$X\tilde{}=ZA \qquad \text{(Exp. 3)}$$

In the following description of the example embodiments, Z and A are referred to as a possible factorization of X~.

The k-th column vector $z_k=[Z_{1,k}, \ldots, Z_{N,k}]^T$ where T denotes a transpose operation) of the matrix Z is a binary vector indicating whether or not the feature k appears in each data n=1, . . . , N, and this vector is referred to as the "occurrence vector" in the description of the example embodiments below.

Several examples with respect to features and combinations will be described (without being limited thereto).

(A1) For example, when the data (vectors $x_n$) are N observed values of a time-domain signal waveform (or spectrum or feature values thereof), the signal waveform (or spectrum or feature values thereof) generated by each of K signal sources can be used as the K features $a_1, \ldots, a_k$. In this case, the combination matrix $Z_{n,k}$ (n: 1≤n≤N, 1≤k≤N) is a binary matrix indicating whether or not the n-th observed value includes the k-th signal source.

(A2) When the data are, for example, vectors in which the numbers of occurrences of observable events such as the number of purchases of each product at a store, the number of visits to each page on a website, and the number of occurrences of each type of error log, expected values of the number of occurrences of K types of potential events existing behind the observable event can be used as the K features $a_1, \ldots, a_k$.

(A3) When the data indicates the numbers of purchases of each of K types of products by N customers, for K types of customer attributes (for example "in his/her twenties", "company employee", "woman", etc.), values indicating how often customers with each attribute are expected to purchase each product can be used as the feature vectors $a_1, \ldots, a_k$. In this case, the combination matrix $Z_{n,k}$ is a binary matrix indicating whether or not the n-th customer has the k-th attribute.

(A4) When the data indicates, for example, the numbers of visits by N customers to K pages on a website, for K types of customer attributes, values indicating how often customers with each attribute are expected to visit each page can be used as the feature vectors $a_1, \ldots, a_k$. In this case, the combination matrix $Z_{n,k}$ is a binary matrix indicating whether or not the n-th customer has the k-th attribute.

(A5) When the data indicates, for example, the numbers of occurrences of each type of error log in N time intervals, for K places where a defect can occur, the number of error logs expected to occur for each type when a defect occurs at each place can be used as the feature vectors $a_1, \ldots, a_k$. In this case, the combination matrix $Z_{n,k}$ is a binary matrix indicating whether or not a defect occurs in the k-th place at the n-th time interval.

(A6) When the data are N images, the K feature vectors $a_1, \ldots, a_k$ may be the images of K objects appearing some or all of the N data images. In this case, the combination matrix $Z_{n,k}$ indicates whether or not the k-th object appears in the n-th image.

In FIG. 1, the transformation part 104 transforms both or either one of the combination matrix 112 stored in the combination storage part 102 and the feature matrix 111 stored in the feature storage part 103 according to a transformation type and parameter given in advance.

In the present example embodiment, each component in the feature matrix 111 stored in the feature storage part 103 shown in FIG. 2 and the combination matrix 112 stored in the combination storage part 102 shown in FIG. 3 may be held in a spatially or logically continuous area. Alternatively, each component may be held in disjointed positions.

Further, it goes without saying that these matrices may be held with the rows and the columns thereof interchanged, i.e., the matrices are transposed.

Further, the feature matrix 111 and the combination matrix 112 may be held as sparse matrices. In a typical sparse matrix storage format called coordinate format, sets of triplets (i j value) (row position (i), column position (j), and a value of a non-zero component in a matrix) are held in a form of an array. As a result, when the matrix is sparse (i.e., when the matrix has a small number of non-zero components), less capacity is required to store the matrix than to hold the entire matrix.

In particular, the combination matrix is a binary matrix where the value of each component is 0 or 1. Hence, the value of a non-zero component is always 1. As a result, when the matrix is held in the coordinate format, it is unnecessary to hold values of non-zero components. Since only a pair (i j) of the row position (i) and the column position (j) of non-zero components needs to be held, one can store the matrix with even less capacity. It goes without saying that, in addition to the coordinate format, the combination matrix 112 and the feature matrix 111 may be held in any other known sparse matrix storage formats such as the Compressed Sparse Row (CSR) format (each row vector is expressed as an array (compressed row) of pairs (j, value) of the column position (i) and the value of a non-zero component, and an associative array that combines these compressed rows across each row and an array of row indexes in the associative array of each compressed row included in the associative array as a partial array are stored) and the Compressed Sparse Column (CSC) (each column sector is expressed as an array (compressed column) of pairs (j, value) of the row position (i) and the value of a non-zero component, and an associative array that combines these compressed columns across each column and an array of column indexes in the associative array of each compressed column included in the associative array as a partial array are stored).

Figure 4:
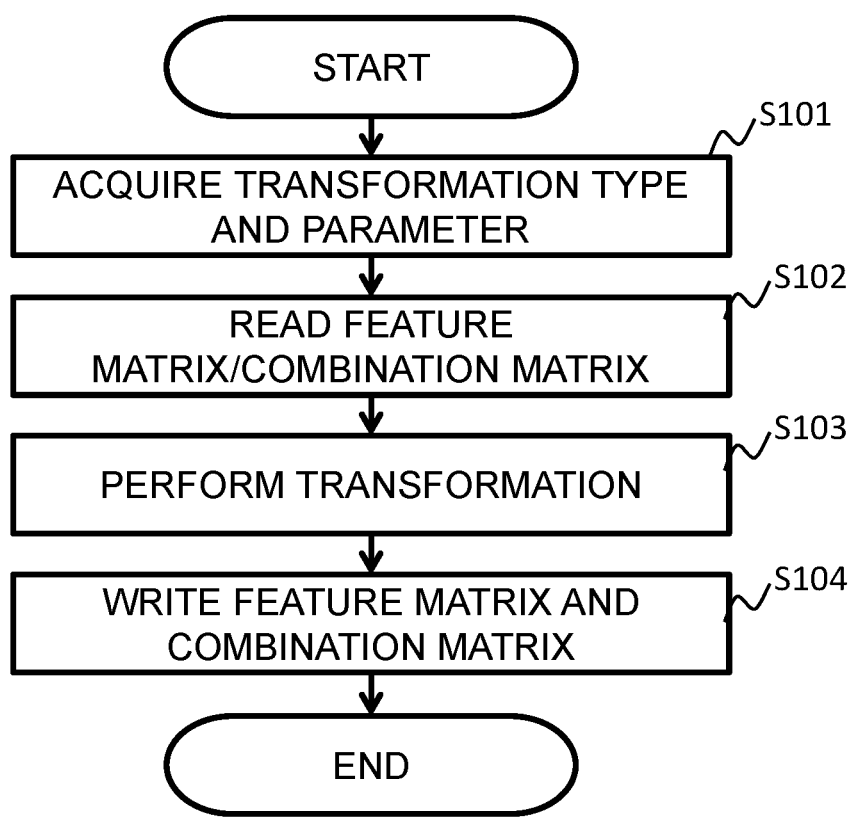
FIG. 4 is a flowchart describing an example of the processing procedure according to the first example embodiment of the present invention.

FIG. 4 is a flowchart describing, a processing procedure of the feature transformation apparatus 101 relating to the first example embodiment. Referring to FIG. 4, the following describes the processing procedure of the first example embodiment discussed with reference to FIGS. 1 to 3.

The transformation part 104 acquires a type of transformation and a parameter (step S101).

Next, the transformation part 104 reads the feature matrix 111 stored in the feature storage part 103 and the combination matrix 112 stored in the combination storage part 102 (both or in some cases, one of them (e.g., the combination matrix 112)) (step S102).

Further, the transformation part 104 executes transformation on the feature matrix 111 and the combination matrix 112 (both or one of them) acquired in the step S102 according to the transformation and the parameter acquired in the step S101 (step S103).

Finally, the transformation part 104 stores the feature matrix and the combination matrix (both or one of them) transformed in the step S103 in the feature storage part 103 and the combination storage part 102 (both respectively, or one of them). At this time, the feature matrix and combination matrix transformed in the step S103 and stored by the transformation part may overwrite the original matrices in the feature storage part 103 and the combination, storage part 102 or be added to a free space in each storage part. Further, the step S102 may be executed before and after the step S101.

Next, the processing of the transformation part 104 will be described. In the following, the feature matrix 111 will be referred to as A: K×D, and the combination matrix as Z: N×K.

If possible matrix factorization (refer to Exp. 3)

$$X^\sim = ZA$$

is not unique, i.e., if there are an N×K binary matrix Z' and an N×D matrix A' such that Z'≠Z, A'≠A, and X$^\sim$=Z'A', factorization can be performed in a plurality of ways. As a result it is difficult to accurately estimate Z and A using an existing estimation algorithm(s).

When a plurality of factorizations exist, the transformation part 104 transforms a possible factorization (Z, A) into another (Z', A'). Hence, it is possible to search for a suitable real solution from a plurality of possible factorizations.

The transformation performed by the transformation part 104 will be described with reference to the plurality of factorization possibilities.

<General Regular Matrix>

When (Z, A) and (Z', A') are both possible factorizations of X$^\sim$, $$X^\sim = ZA = Z'A' \quad \text{(Exp. 4)}$$

holds. When the matrix rank of Z and A is K, by using a K×K regular matrix U, the above (Z', A') is limited to those that can be expressed in the form of $$Z' = ZU$$

$$A' = U^{-1}A \quad \text{(Exp. 5)}$$

U$^{-1}$ is an inverse matrix of U.

Conversely, when (Z, A) is a possible factorization of X$^\sim$, if Z' is a binary matrix for (Z', A') satisfying Exp. 5, the following holds.

$$Z'A' = ZUU^{-1}A = ZIA = ZA = X^\sim \quad \text{(Exp. 6)}$$

(UU$^{-1}$=I: I is a K×K identity matrix.)

From Exp. 6, it can be seen that (Z', A') is certainly a factorization of X$^\sim$.

The transformation part 104 acquires a product of regular matrices as the type of transformation and components of U as parameters, and transforms at least one of the combination matrix Z stored in the combination storage part 102 and the feature matrix A stored in the feature storage part 103 using Exp. 5.

The matrix U in Exp. 5 will be referred to as "transformation matrix" hereinafter.

Further, when the matrices Z' and A' transformed in Exp. 5 are a possible factorization of X$^\sim$, the matrix U is referred to as a "possible transformation matrix." Further, transformation by the transformation part 104 using a "possible transformation matrix" may be referred to as "possible transformation."

In the present example embodiment (and other example embodiments described later), the transformation matrix U may be a unimodular matrix.

When (Z, A) is a possible factorization of X$^\sim$, in order for the matrices Z' and A' transformed using Exp. 5 to be a possible factorization of X$^\sim$, Z' should be a binary matrix as described above.

That is, the condition for (Z' A') to be a possible factorization of X$^\sim$ is that the transformation matrix U is included in the following set.

$$G(Z) = \{U | U \text{ is a regular matrix} \wedge ZU \text{ is an integer matrix} \wedge 0 \leq ZU \leq 1\} \quad \text{(Exp. 7)}$$

Here, the inequality $$0 \leq ZU \leq 1$$

indicates that each component of the matrix ZU is 0 or more and 1 or less. Further, G(Z) in Exp. 7 is a defining function denoting a set of the matrix U when the matrix Z is given.

Furthermore, the following two conditions are added.

(a) U is an integer matrix.

(b) The absolute value of the determinant of U is 1.

Since these conditions (a) and (b) impose more restrictions to the transformation matrix U, it is not the case that all possible transformation matrices U satisfy the conditions (a) and (b).

With respect to the condition (a), however, since Z' and Z are binary matrices in the equality Z'=ZU (i.e., integer matrices), U is also expected to be an integer matrix in many cases.

The condition (b) means that a measure of A does not change before and after the transformation A'=U$^{-1}$A, which is expected to hold in many cases.

A matrix satisfying the conditions (a) and (b) is a unimodular matrix. A unimodular matrix is an integer matrix having determinant +1 or −1. An inverse of a unimodular matrix is also a unimodular matrix, and transformation by the unimodular matrix forms a closed set in the ring of integers.

Further, when the transformation part U satisfies the condition (a), ZU is always an integer matrix. Therefore, a set of the transformation matrices U satisfying the conditions in Exp. 7 and the conditions (a) and (b) are expressed by the following equation.

$$H(Z)=\{U|U \text{ is a unimodular matrix} \wedge 0 \le ZU \le 1\} \quad \text{Exp 8}$$

That is, the transformation part 104 acquires a unimodular matrix as a type of transformation and the components of U as parameters in this case.

Then the transformation part 104 transforms at least one of the combination matrix 112 (Z) held in the combination storage part 102 and the feature matrix 111 (A) held in the feature storage part 103 using Exp. 5. Note that H(Z) in Exp. 8 is a defining function denoting the set of the unimodular matrix U when the matrix Z is given.

The transformation matrix U may be transformation: $z_i + z_j$ where the occurrence vector $z_i$ of a feature $a_i$ (i=1, . . . , K) is added to the occurrence vector $z_j$ of another feature, or transformation: $-z_i$ that inverts the sign of the occurrence vector $z_i$ of the feature $a_i$, or transformation that applies these process transformation multiple times sequentially.

Note that each column vector $z_i$ (i=1, . . . , K) of the combination matrix $Z=[z_1, z_2, \ldots, z_K]$ is referred to as the "occurrence vector" herein.

It is known that all unimodular matrices are factorized into the products of the elementary matrices in the following forms.

$$P_{i,j} = \begin{bmatrix} 1 & & & & & & \\ & \ddots & & & & & \\ & & 0 & & 1 & & \\ & & & \ddots & & & \\ & & 1 & & 0 & & \\ & & & & & \ddots & \\ & & & & & & 1 \end{bmatrix} \quad \text{(Exp. 9)}$$

$$Q_i = \begin{bmatrix} 1 & & & & & \\ & \ddots & & & & \\ & & 1 & & & \\ & & & -1 & & \\ & & & & 1 & \\ & & & & & \ddots \\ & & & & & & 1 \end{bmatrix} i$$

$$R_{i,j}(n) = \begin{bmatrix} 1 & & & & & \\ & \ddots & & & & \\ & & 1 & n & & \\ & & & \ddots & & \\ & & & & 1 & \\ & & & & & \ddots \\ & & & & & & 1 \end{bmatrix} j$$

Note that i≠j and n is an integer.

$P_{i,j}$ is a matrix in which the columns i and j of an identity matrix are interchanged, $Q_i$ is a matrix in which the value of the (i, i) component of an identity matrix is −1, $R_{i,j}$ is a matrix in which the value of the (i, j) component of an identity matrix is n.

That is, the transformations by all the transformation matrices U expressed by the set of Exp. 8 are equivalent to combining the transformations by the elementary matrices in the forms expressed by Exp. 9 and sequentially applying them.

$P_{i,j}$ is a permutation matrix. The transformation using Exp. 5 when the transformation matrix $U=P_{i,j}$ corresponds to exchanging the suffices of the feature $a_i$ and the feature $a_j$. As a result, no substantial transformation is performed. Therefore, it is unnecessary to apply the transformation by $P_{i,j}$.

The transformation $Z'=ZU$ of Exp. 5, by using the transformation matrix $U=R_{i,j}(n)$ corresponds to the transformation in which the occurrence vector $z_i$ of the feature $a_j$ times n is added to the occurrence vector $z_j$ of the feature $a_j$.

$$z_j' = z_i + n \times z_j$$

This transformation is equivalent to applying the transformation using $R_{i,j}(1)$ n times when n is a positive number. Further, it is equivalent to applying the transformation using $Q_i$, then applying the transformation using $R_{i,j}(1)$ m times, and then applying again the transformation using $Q_i$ when n is a negative number n=−m.

Hereinafter, $R_{i,j}(1)$ is simply referred to as $R_{i,j}$. That is, $R_{i,j}$ is a matrix of the following form.

$$R_{i,j} = \begin{bmatrix} 1 & & & & & \\ & \ddots & & & & \\ & & 1 & 1 & & \\ & & & \ddots & & \\ & & & & 1 & \\ & & & & & \ddots \\ & & & & & & 1 \end{bmatrix} j \quad \text{(Exp. 10)}$$

From the above, any "possible transformation" expressed by Exp. 8 is equivalent to sequentially applying the transformation using $Q_i$ and the transformation using $R_{i,j}$.

That is, the transformation part 104 can execute any "possible transformation" expressed in Exp. 8, by sequentially applying the transformations represented in $Q_i$ and $R_{i,j}$.

Here, the transformation of Exp. 5 by the transformation matrix $U=Q_i$:

$$Z'=ZU$$

corresponds to the transformation ($z_i'=-z_i$) that inverts the sign of the occurrence vector $z_i$ (the i-th column vector of the combination matrix Z) corresponding to the feature $a_i$. That is to say, when the occurrence vector $z_i$ include 1 as a component, −1 appears in the occurrence vector $z_i'$ of the combination matrix Z' transformed using the transformation matrix $U=Q_i$, and this means that Z' is not a binary matrix. Therefore, $Q_i$ alone does not become a possible transformation.

However, as in the transformation matrices described later such as $Q_i R_{ij}$,
$Q_j R_{ij} Q_j$,
$Q_k R_{ik} R_{jk}$, by combining a plurality of transformations using $Q_i$ and $R_{ij}$ and sequentially applying them, the transformed combination matrix Z' may become a binary matrix and a possible transformation matrix.

The transformation of Exp. 5 by the transformation matrix $U=Q_i$:

$$A' = U^{-1}A$$

corresponds to the transformation $(a_i' = -a_i)$ that inverts a sign of the feature vector $a_i$.

The transformation of Exp. 5 by the transformation matrix $U=R_{i,j}$:

$$Z' = ZU$$

corresponds to the transformation $(z_j' = z_i + z_j)$ that sets the value obtained by adding the occurrence vector $z_i$ (the i-th column vector of the combination matrix Z) to the occurrence vector $z_j$ (the j-th column vector of the combination matrix Z) as the j-th column vector $(z_j')$ of the transformed combination matrix Z'.

The transformation of Exp. 5 by the transformation matrix $U=R_{i,j}$:

$$A' = U^{-1}A$$

corresponds to the transformation $(a_i' = a_i - a_j)$ that sets the value obtained by subtracting the feature vector $a_j$ (the j-th row vector of the feature matrix A) from the feature vector $a_i$ (the i-th row vector of the feature matrix A) as the i-th column vector $(a_i')$ of the transformed feature matrix A'.

Therefore, the transformation part 104 may sequentially execute a combination of the two types of transformations ($Q_i$ and $R_{i,j}$) described above.

In this case, in the step S101 of FIG. 4, the transformation part 104 acquires at least one set of a type of transformation (R or Q); and parameters (the subscripts i, j in the case of R; the subscript in the case of Q).

Then, the transformation part 104 sequentially performs transformations using a combination of $R_{i,j}$ and $Q_i$ based on the acquired type of transformation and parameters in the step S103.

Here, the transformation part 104 may apply a sequential transformation, while sequentially acquiring types of transformation and parameters one by one, or may apply a sequential transformation after having acquired a type of transformation and parameters at once.

Figure 5:
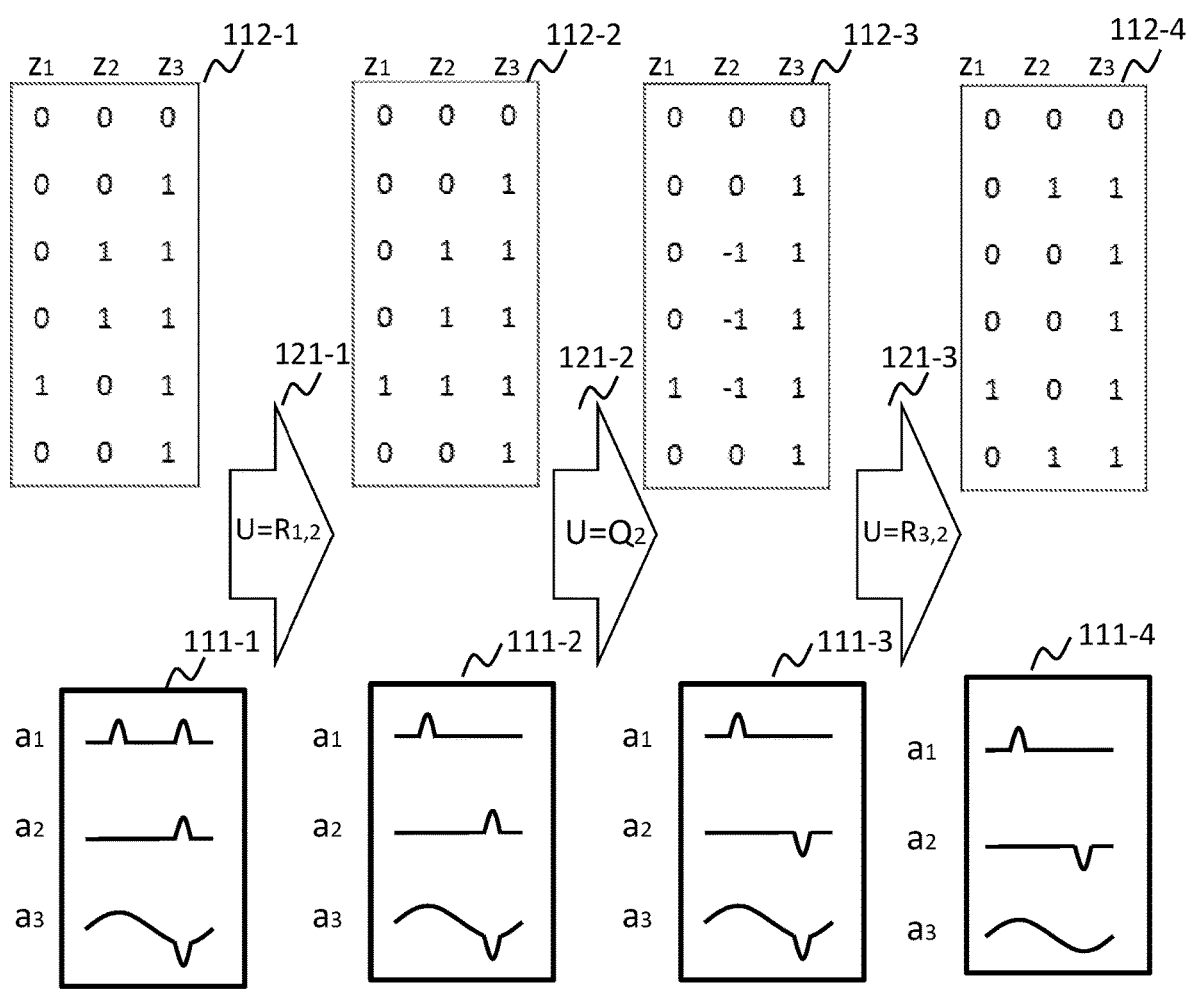
FIG. 5 is a schematic diagram illustrating an example of transformation by a transformation part according to the first example embodiment of the present invention.

Next, a combination example of the transformation matrices $R_{i,j}$ and $Q_i$ will be described. FIG. 5 is a diagram explaining an example of the operation of the transformation part 104 shown in FIG. 1.

In the step S101 in FIG. 4, it is assumed that the transformation part 104 acquires as the type of transformation and parameters, for example, a string;

"R(1, 2) Q(2) R(3, 2)"

via an input apparatus (not shown), with a format not limited thereto. Note that "R(1, 2)," "Q(2)," and "R(3, 2)" represent input strings corresponding to the transformation matrices $R_{1,2}$, $Q_2$, and $R_{3,2}$, respectively.

Responsive to the input, the transformation part 104 transforms the combination matrix 112 and the feature matrix 111 in the step S103 in FIG. 4 and obtains the transformed combination matrix 112 and feature matrix 111. The input apparatus (not shown) may be an input apparatus including a keyboard or touch panel, a controller that reads information (type of transformation and parameters) stored in advance in a storage apparatus such as an HDD, or a communication apparatus (communication interface) including a reception part that receives information (a string) supplied by a communication terminal communication network.

Here, each feature vector in a feature matrix 111-1 in FIG. 5 schematically shoves a plot of the vector components as the feature vectors 13 to 16 in FIG. 1 described above. This also applies to transformed feature matrices 111-2 to 111-4.

Note that the apostrophes in a transformed combination matrix 112-2 $(Z'=ZU=[z'_1, z'_2, z'_3, \ldots])$ are omitted. This is also the case with transformed combination matrices 112-3 and 112-4. It goes without saying that omitting the apostrophe from Z'=ZU does not mean that the original combination matrix in the combination storage part 102 is overwritten and the transformed matrices may be simply added. Further, the apostrophes in the transformed feature matrix 111-2 $(A'=U^{-1}A=[a'_1, a'_2, a'_3, \ldots])$ are omitted. This is also the case with transformed feature matrices 111-3 and 111-4. It goes without saying that omitting the apostrophe from $A'=U^{-1}A$ does not mean that the original feature matrix in the feature storage part 103 is overwritten and the transformed matrices may be simply added.

In the step S103 FIG. 4, the transformation part 104 extracts "R(1, 2)" from the string acquired in the step S101 with a command interpreter (not shown), interprets it, and applies a transformation as follows (a transformation 121-1).

The type of transformation: R;

Parameters: a transformation of 1 and 2 using a transformation matrix $R_{1,2}$ (transformation $ZR_{1,2}$ that adds the occurrence vector $z_1$ to the occurrence vector $z_2$ and transformation $R^{-1}_{1,2}A$ that subtracts the feature vector $a_2$ from the feature vector $a_1$)

Next, the transformation part 104 interprets "Q(2)" from the string, and applies a transformation as transformation 121-2).

The type of transformation: Q

Parameters: a transformation of 2 ($Q_2$) (transformation $ZQ_2$ that inverts the sign of the occurrence vector $z_2$ and transformation $Q^{-1}_2 A$ that inverts the sign of the feature vector $a_2$)

Further, the transformation part 104 interprets "R(3, 2)" from the string, and applies a transformation as follows (a transformation 121-3).

The type of transformation: R

Parameters: a transformation of 3 and 2 ($R_{3,2}$) (transformation $ZR_{3,2}$ that adds the occurrence vector $z_3$ to the occurrence vector $z_2$ and transformation $R^{-1}_{3,2}A$ that subtracts the feature vector $a_2$ from the feature vector $a_3$)

The transformation part 104 stores the transformed combination matrix 112 (112-4) and feature matrix 111 (111-4) obtained described in the combination storage part 102 and the feature storage part 103, respectively, in the step S104.

The transformation part 104 may transform the combination matrix 112 by subtracting an occurrence vector $z_i$ from another occurrence vector $z_j$ or by subtracting another occurrence vector $z_j$ from an occurrence vector $z_i$ and substituting the result for $z_j$.

Further, the transformation part 104 may transform the feature matrix 111 by adding a feature vector $a_j$ to another feature vector $a_i$ and then inverting a sign of the feature vector $a_j$ or by adding a feature vector $a_i$ to another feature vector $a_j$.

With respect to the transformation combining $R_{ij}$ and $Q_i$ and sequentially applying them, let us consider a transformation using $R_{ij}$ only once. Such a transformation matrix U may be expressed as $$U = Q_{k(1)} \ldots Q_{k(m)} R_{ij} Q_{1(1)} \ldots Q_{1(n)} \quad \text{(Exp. 11)}$$

using integers i, j, k(1), ..., k(m), and l(1), ..., l(n).

However, in view of the fact that applying $Q_i$ having the same subscript twice results in an original state (i.e., $Q_i Q_i = I$: identity matrix) and a combination matrix $Z' = ZU$ after the transformation is a binary matrix (not including any negative integer or integer greater than 1), possible transformations are limited to the following three types.

$$U = R_{ij}, Q_j R_{ij}, Q_j R_{ij} Q_j$$

Here, $R_{i,j}$ is a K×K matrix defined by Exp. 10, and $Q_j R_{ij}$ and $Q_j R_{ij} Q_j$ are matrices of the following forms.

$$Q_j R_{i,j} = \begin{bmatrix} 1 & & & & & & \\ & \ddots & & & & & \\ & & 1 & & 1 & & \\ & & & \ddots & & & \\ & & & & -1 & & \\ & & & & & \ddots & \\ & & & & & & 1 \end{bmatrix} j \quad \text{(Exp. 12a)}$$

$$Q_j R_{i,j} Q_j = \begin{bmatrix} 1 & & & & & & \\ & \ddots & & & & & \\ & & 1 & & -1 & & \\ & & & \ddots & & & \\ & & & & 1 & & \\ & & & & & \ddots & \\ & & & & & & 1 \end{bmatrix} j \quad \text{(Exp. 12b)}$$

As described above, the transformation of Exp. 5 using the transformation matrix $U = R_{ij}$ $$Z' = ZU$$

corresponds to the transformation ($z_j' = z_i + z_j$) that sets a result of adding the occurrence vector $z_i$ at the i-th column corresponding to the feature vector $a_i$ at the i-th (i=1, ..., K) to the occurrence vector $z_j$ at the j-th column corresponding to the feature vector at the j-th row (j=1, ..., K) in the combination matrix 112 (Z), as the occurrence vector $z_j'$ at the j-th column, of the transformed combination matrix 112 (Z').

The transformation of Exp. 5 by the transformation matrix $U = R_{ij} A' = U^{-1} A$
corresponds to the transformation ($a_i' = a_i - a_j$) that sets a result of subtracting the feature vector $a_j$ at the j-th row (j=1, ..., K) from another feature vector a at the i-th row (i=1, ..., K) in the feature matrix 111 (A), as the feature vector $a_i$ of the i-th row after the transformation.

Further, the transformation of Exp. 5 by the transformation matrix $U = Q_j R_{ij}$:

$$Z' = ZU$$

corresponds to the transformation ($z_j' = z_i - z_j$) that substitutes a result of subtracting the occurrence vector $z_i$ at the i-th column corresponding to the feature vector $a_i$ at the i-th row from the occurrence vector $z_j$ at the j-th column corresponding to the feature vector $a_j$ at the i-th row for the occurrence vector $z_j'$ at the j-th column in the combination matrix 112 (Z).

The transformation of Exp. 5 by the transformation matrix $U = Q_j R_{ij}$ $$A' = U^{-1} A$$

corresponds to the transformation ($a_i' = a_i + a_j$, $a_j' = -a_j$) that adds the feature vector $a_j$ at the j-th row (j=1, ..., K) to the feature vector $a_i$ of the i-th row (i=1, ..., K) and then inverts a sign of the feature vector $a_j$ of the j-th row (j=1, ..., K) in the feature matrix 111 (A).

Further, the transformation of Exp. 5 by the transformation matrix $U = Q_j R_{ij} Q_j$ $$Z' = ZU$$

corresponds to the transformation ($z_j' = -z_i + z_j$) that sets a result of subtracting the occurrence vector $z_i$ corresponding to the feature vector $a_i$ at the i-th row (i=1, ..., K) from the occurrence vector $z_j$ corresponding to the feature vector $a_j$ the j-th row (j=1, ..., K) in the feature matrix 111 (A) as the occurrence vector $z_j'$ of the j-th column of the transformed combination matrix 112 (Z').

The transformation of Exp. 5 using the transformation matrix $U = Q_j R_{ij} Q_j$ $$A' = U^{-1} A$$

corresponds to the transformation ($a_i' = a_i + a_j$) that sets the value obtained by adding the feature vector $a_i$ of the i-th row (i=1, ..., K) to the feature vector $a_j$ of the j-th row (j=1, ..., K) as the feature vector $a_i$ of the i-th row of the transformed feature matrix 111 (A').

Here, by sequentially applying a combination of the three types of transformation
$R_{ij}, Q_j R_{ij}, Q_j R_{ij} Q_j$, any possible transformation expressed by Exp. 8 can be realized.

This is because the product, of the transformation matrices is:

$$Q_i R_{ji} Q_i R_{ji} Q_i = Q_i. \quad \text{(Exp. 13)}$$

Therefore, for any i (i=1, ..., K), it is possible to perform the same transformation as the one using $Q_i$ by sequentially applying the transformations using $Q_i R_{ji}$ and $Q_i R_{ji} Q_i$. As described above, this is because the transformation using an arbitrary transformation matrix U expressed by Exp. 8 is equivalent to applying one of or a combination of the transformation by $Q_i$, and the transformation by $R_{ji}$ sequentially.

In this case, the transformation part 104 acquires at least one set of a type of the transformation (R, QR, or QRQ) and parameters (subscripts i, j), and sequentially performs transformations using any of the following transformation matrices according to the transformation type and parameters.

$R_{ij}$;
$Q_i R_{ij}$; and
$Q_j R_{ij} Q_j$

For example, the transformation part 104 acquires a type of transformation and parameters, for example, as a string "QR(1, 2) QRQ(2, 3) R(4, 2)" from the input apparatus (not shown), though the format not particularly limited thereto Then the transformation part 104 interprets the input string and sequentially applies transformations to the combination matrix 112 (Z) and the feature matrix 111 (A) (both or one of them) by the transformation matrix:

$$U = Q_2 R_{12}, Q_3 R_{23} Q_3, R_{42}$$

Further, the transformation part 104 may transform the combination matrix by taking the difference between a sum of an occurrence vector $z_i$ and another occurrence vector $z_j$ and yet another occurrence vector $z_k$ and substituting the result for $z_k$.

Further, the transformation part 104 may transform the feature matrix by adding a feature vector $a_k$ to another feature vector $a_s$, further adding $a_k$ to yet another feature vector $a_j$ and then inverting a sign of $a_k$.

With respect to the transformation combining $R_{ij}$ and $Q_i$ and sequentially applying them, let us consider a transformation only changing the occurrence vector $z_k$ of a feature in the combination matrix and further performing the transformation of $R_{ij}$ only twice. In view of the fact that the transformed combination matrix Z'=ZU is a binary matrix ($z_k$ does not include any negative integer or integer more than 1), a possible transformation is limited to the following form.

$$U = Q_k R_{ik} R_{jk} \quad \text{(Exp. 14)}$$

Here, the transformation of Exp. 5 by the transformation matrix $U = Q_k R_{ik} R_{jk}$:

$$Z' = ZU = Z Q_k R_{ik} R_{jk} \quad \text{(Exp. 15)}$$

corresponds to the transformation ($z_k' = z_j - z_k$) that takes the difference between a sum of the occurrence vector $z_i$ at the i-th row and the occurrence vector $z_j$ at the j-th row and the occurrence vector $z_k$ at the k-th row in the combination matrix 112 (Z) and substituting the result for the occurrence vector $z'_k$ at the k-th row after the transformation Further, the transformation of Exp. 5 by the transformation matrix $U = Q_k R_{ik} R_{jk}$:

$$A' = U^{-1} A = R^{-1}_{jk} R^{-1}_{ik} Q^{-1}_{k} A \quad \text{(Exp. 16)}$$

corresponds to the transformation ($a_k' = a_i + a_k$, $a_j' = a_j + a_k$, $a_k' = -a_k$) that sets a result of adding the feature vector $a_k$ at the k-th row (k=1, . . . , K) to the feature vector $a_i$ at the i-th row (i=1, . . . , K) in the feature matrix 111 (A), as the feature vector $a_k'$ at the k-th row of the transformed feature matrix 111 (A'), further sets a result of adding the feature vector $a_k$ at the k-th row to the feature vector $a_j$ at the j-th row (j=1, . . . , K) as the feature vector $a_j'$ at the j-th row of the transformed feature matrix 111 (A'), and then inverts a sign of the feature vector $a_k$ at the k-th row.

In this case, the transformation part 104 acquires a set of a transformation type (QRR) and parameters (subscripts i, j, k); and applies the transformation using the transformation matrix $Q_k R_{ik} R_{jk}$ (to both of the combination matrix and the feature matrix or one of them) according thereto.

FIG. 6 shows a table 131 summarizing and listing transformation types and parameters of the transformation matrix U and transformations performed by the transformation part 104 in the step S103 in FIG. 4 (transformations of the combination matrix Z and the feature matrix A).

As shown in FIG. 6, the transformation part 104 acquires at least one set of a transformation type and a parameter in the step S101 in FIG. 4, and sequentially performs transformations on the combination matrix Z or the feature matrix A according to the acquired transformation type and parameter in the step S103 in FIG. 4.

In the transformation of the combination matrix, the transformation part 104 may perform transformation which rounds values of the combination matrix to 0 or 1, in addition to the transformations described above.

The above described transformation operations b the transformation part 104 which are obtained by combining transformations shown in FIG. 6 can realise transformations by all the "possible transformation matrices" expressed by Exp. 8. On the other hand, not all the transformations shown in FIG. 6 are "possible transformations," and hence there are some cases Where the combination matrix after (subjected to) transformation includes a negative integer or an integer of 2 or more, and is no more a binary matrix.

In order to avoid such a problem, in addition to the transformations shown in FIG. 6, the transformation which rounds the values in the matrix to 0 or 1 so that the transformed combination matrix becomes a binary matrix may be performed.

As a method for rounding an integer matrix to a binary matrix, either one of two types of transformation (clip or parity) expressed by the following equations may be used.

$$\text{clip: } Z'_{ij} = \begin{cases} 1, & Z_{ij} \geq 1 \\ 0, & Z_{ij} \leq 0 \end{cases} \quad \text{(Exp. 17)}$$

$$\text{parity: } Z'_{ij} = Z_{ij} \bmod 2 \quad \text{(Exp. 18)}$$

That is, the rounding transformation; dip is a rounding transformation r hi h obtains a binary matrix by setting a value of each element of the combination matrix to 1 when the value is 1 or more, while setting the value to 0 when the value is 0 or less. This transformation is a rounding transformation which makes the L1 norm between the combination matrix Z before the transformation and the transformed combination matrix Z'

$$|Z - Z'|_1 \quad \text{(Exp. 19)}$$

minimum. Hence, clip has an advantage that it is possible to perform transformation into a binary matrix with a small change.

The transformation parity is a transformation which performs mod 2 operation on each element of the combination matrix. Since a value of 2 taken by an element before the transformation is set to 0 after the transformation, the change due to the rounding transformation becomes large, as compared with clip.

However, as will be described later, there is an advantage that a transformation obtained by combining the transformation by a unimodular matrix and the transformation by parity becomes always reversible.

When the transformation part 104 performs the rounding transformation expressed by Exp. 17 or 18 in addition to the transformation by the transformation matrices shown in FIG. 6, the transformation part 104 acquires a type of the rounding transformation (clip or parity) in the step S101 in FIG. 4 in addition to a combination of sets of transformation types and parameters shown in FIG. 6.

Further, in the step S103 in FIG. 4, the transformation part 104 applies rounding processing (clip or parity) to the combination matrix according to the acquired rounding transformation type.

The following describes a combination of R* (exclusive OR operation) as a transformation matrix.

The transformation part 104 may transform the combination matrix by performing an exclusive-OR operation on an occurrence vector $z_i$ of a feature and an occurrence vector $z_j$ of another feature.

As described above, all the possible transformations (the transformation matrices U) expressed by Exp. 8 are equivalent to the transformation by the transformation matrices $R_{ij}$, $Q_j R_{ij}$, and $Q_j R_{ij} Q_j$ shown in FIG. 6 and a transformation combining them. At this time, the transformed combination matrix Z' is expressed by the following equation.

$$Z' = ZU = ZU^{(1)}_{i_1,j_1} U^{(2)}_{i_2,j_2} \ldots U^{(n)}_{i_n,j_n} \quad \text{(Exp. 20)}$$

Here, the matrix $U^{(m)}_{im,jm}$ (M=1, ..., n) in Exp. 20 is any of the following.

$R_{im,jm}$,
$Q_{jm} R_{im,jm}$,
$Q_{jm} R_{im,jm} Q_{jm}$

When A transformation matrix U is a "possible transformation." i.e., the transformed matrix Z'=ZU is a binary matrix, further applying the above described rounding transformation parity to the transformed matrix Z' does not change values (Z'=Z' mod 2).

This is because performing mod 2 operation per each component of a matrix With components having values of 0 or 1 (binary matrix) does not change the values of the components. Then, Exp. 20 is modified as follows.

$$Z' = Z' \bmod 2 = ZU^{(1)}_{i_1,j_1} \ldots U^{(n)}_{i_n,j_n} \bmod 2 = \quad \text{(Exp. 21)}$$
$$(Z \bmod 2)(U^{(1)}_{i_1,j_1} \bmod 2) \ldots (U^{(n)}_{i_n,j_n} \bmod 2) \bmod 2$$

Regarding the factor on the right side (Z mod 2) in Exp. 21, performing mod 2 operation per each element does not change the value since the combination matrix Z before the transformation is a binary matrix. Thus, $$(Z \bmod 2) = Z \quad \text{(Exp. 22)}$$

With respect to the matrices $R_{ij}$, $Q_j R_{ij}$, and $Q_j R_{ij} Q_j$ defined by Exp. 10 and Exp. 12, the following holds.

$R_{ij} \bmod 2 = R_{ij}$, $Q_j R_{ij} \bmod 2 = R_{ij}$, $Q_j R_{ij} Q_j \bmod 2 = R_{ij}$ \quad (Exp. 23)

$U^{(m)}_{i,j}$ is any one of $R_{ij}$, $Q_j R_{ij}$, and $Q_j R_{ij} Q_j$. Hence, Exp. 22 is further modified as follows.

$$Z' = ZR_{i_1,j_1} R_{i_2,j_2} \ldots R_{i_n,j_n} \bmod 2 = \quad \text{(Exp. 24)}$$
$$( \ldots ((ZR_{i_1,j_2} \bmod 2) R_{i_2,j_2} \bmod 2) \ldots ) R_{i_n,j_n} \bmod 2 =$$
$$Z * R_{i_1,j_1} * R_{i_2,j_2} * \ldots * R_{i_n,j_n}$$

Note that the binary operator "*" in Exp. 24 denotes an operation that performs a matrix product (multiplication) on two matrices and then performs mod 2 operation per each element. That is, for any A and B, $A * B = AB \bmod 2$ Further, since this binary operation "*" is associative (for any A, B, and C, $A*(B*C)=(A*B)*C$ holds) and the order in the operation does not affect a result, parentheses are omitted in the notation when there is no particular confusion.

Here, applying the matrix $R_{ij}$ to the combination matrix Z from the right via the operator "*" corresponds to the exclusive-OR addition of an occurrence vector $z_i$ and another occurrence vector $z_j$. That is, the transformation in the form of Exp. 10 is equivalent to a transformation combining transformations that perform an exclusive-OR operation on an occurrence vector $z_i$ and another occurrence vector $z_j$ and sequentially applying the combined transformations.

In this case, the transformation part 104 acquires at least one set of a transformation type (R-parity) and parameters (subscripts i, j) in the step S101 in FIG. 4.

The transformation part 104 sequentially executes transformations (performing an exclusive-OR operation on an occurrence vector $z_i$ and another occurrence vector $z_j$) according to the acquired transformation type and parameters in the step S103 in FIG. 4.

The above described transformations expressed by Exp. 17, Exp 18, and Exp. 24 are summarized in FIG. 7.

The transformation part 104 may combine only the transformations shown in the table (list) 131 in FIG. 6 and sequentially apply them or combine the transformations shown in the table (list) 131 and the transformations shown in a table (list) 132 in FIG. 7 and sequentially apply them.

Next, estimation of a feature matrix A when rounding processing is performed will be described.

Transformation of the feature matrix by the transformation part 104 may be a transformation which determines the feature matrix so as to minimize a residual of matrix factorization when the combination matrix is fixed and the feature matrix is varied.

The transformation shown in FIG. 7 can only be applied to the combination matrix and cannot be applied, as it is, to the feature matrix.

In this case, by calculating the corresponding feature matrix after the combination matrix has been transformed, the feature matrix after transformation can be derived.

Here, let the combination matrix before transformation Z and the feature matrix A be possible factorizations of $X^\sim$, $X^\sim = ZA$. When the combination matrix after transformation Z' is obtained by the transformation shown in FIG. 7, the corresponding feature matrix after transformation A' may be determined so that $$X^\sim = Z'A'$$

holds (refer to Exp. 3 and Exp 4).

However, since the transformation in FIG. 7 uses the rounding transformation, the relationship in Exp. 5 is satisfied only approximately. Therefore, A' exactly satisfying $X^\sim = Z'A'$ does not always exist. In this case, by calculating A' so that the matrix norm of the residual of the matrix factorization after the transformation $$|X^\sim - Z'Z'| \quad \text{(Exp. 25)}$$

is minimized, the matrix A' after the matrix transformation can be approximately derived. That ism A' is a solution of the following optimization problem.

$$A' = \underset{B}{\mathrm{argmin}} |ZA - Z'B| \quad \text{(Exp. 26)}$$

At this time, in the step S103 in FIG. 4, the transformation part 104 transforms the combination matrix by applying one of the transformations listed in FIGS. 6 and 7 or by combining a plurality of the transformations and sequentially applying them to the combination matrix.

Further, the transformation part 104 transforms the feature matrix A into the transformed feature matrix A' by solving the optimization problem of Exp. 26 by using the combination matrix before transformation Z and the matrix after transformation Z'. In particular, when the matrix norm in Exp. 26 is a Frobenius norm, the solution of the optimization problem of Exp. 26 is given by the following equation.

$$A' = Z'^{+} Z A \quad \text{(Exp. 27)}$$

where $Z'^{+}$ is a pseudo-inverse matrix of $Z'$. In the step S103 in FIG. 4, the transformation part 104 transforms the combination matrix by applying one of the transformations listed in FIGS. 6 and 7 or by combining a plurality thereof and sequentially applying them to the combination matrix.

Further, the transformation part 104 transforms the feature matrix A into the transformed feature matrix A' by Exp. 27 using the combination matrix Z before transformation and the combination matrix Z' after transformation.

Next, the following describes how the types of transformation and parameters are acquired. As described above, in the step S101 in FIG. 4, the transformation part 104 of the feature transformation apparatus 101 acquires a transformation type and a parameter(s) shown in the table 131 in FIG. 6 or in the table 132 in FIG. 7, or expressed in Exp. 26 or 27, or a transformation and parameter(s) combining a plurality thereof, and executes the transformation corresponding to the acquired transformation type and parameter(s) in the step S103 in FIG. 4.

When only one type of the transformation is used out of the transformations shown in FIGS. 6 and 7 and expressed by Exp. 26 and Exp. 27, the transformation part 104 may be configured to execute said type of the transformation. In this case, the transformation part 104 only acquires a parameter(s) of the transformation and executes the corresponding transformation.

The feature transformation apparatus 101 in FIG. 1 may further be connected to an input apparatus and a display apparatus, and the transformation part 104 may acquire a transformation type and parameter from the input apparatus to perform a transformation.

Figure 8:
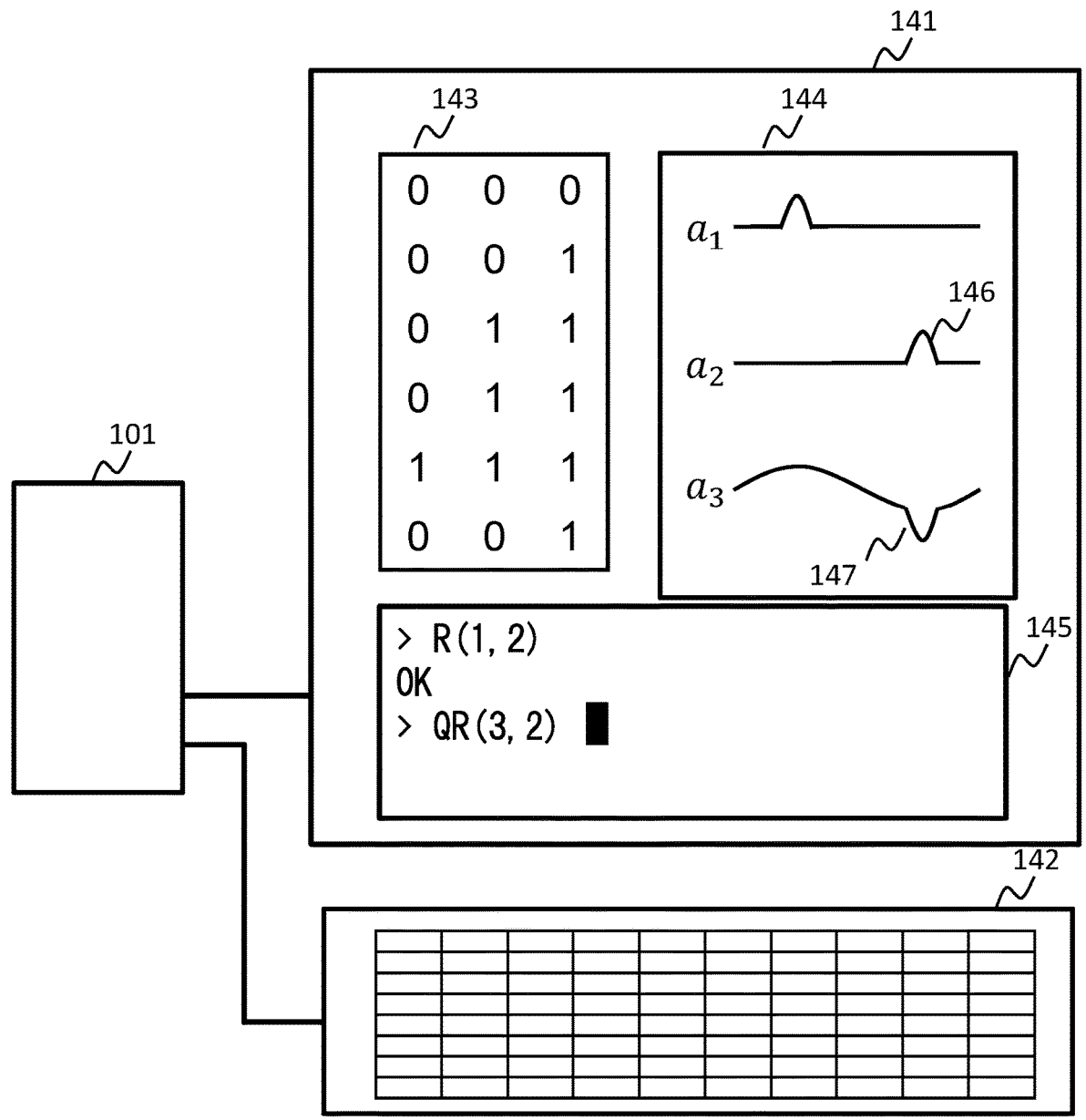
FIG. 8 is a schematic diagram illustrating optimization in the first example embodiment of the present invention.

FIG. 8 is a diagram schematically illustrating an example of the operation when the feature transformation apparatus 101 is connected to an input apparatus and a display apparatus. In FIG. 8, the feature transformation apparatus 101 is connected to the display apparatus 141 and the input apparatus 142.

On the display apparatus 141, values of a combination matrix 143 stored in the combination storage part 102 and values of a feature matrix 144 stored in the feature storage part 103 are displayed. An interactive input window 145 of the display apparatus 141 displays a transformation type and parameters "QR (3, 2)" which is being on input from the input apparatus 142, a transformation type and parameters "R (1, 2)" already entered, and "OK" indicating that the transformation already entered has been successful.

A user of the feature transformation apparatus 101 is able to easily grasp a possible transformation which the user should input next in order to obtain a feature combination of suitable factorization by looking at the combination matrix 143 and the feature matrix 144 displayed on the display apparatus 141.

For example, in the feature matrix 144 (corresponding to 111 in FIG. 2) displayed on the display apparatus 141, a second feature $a_2$ and a third feature $a_3$ have peaks 146 and 147, respectively, having the same shape but different signs. In general, since it is unlikely that two different features happen to have the same shape, it may be appropriate to apply such a transformation that no two features have the same shape in order to perform accurate factorization.

In this case, by adding the second feature $a_i$ to the third feature $a_3$, the peak shape 147 appearing in as may be removed. This can be realized by applying a transformation accompanied with the following operation for the feature matrix.

$$a_3' = a_3 + a_2$$

In the "TRANSFORMATION OF FEATURE" field shown in FIG. 6, the transformations including the operation $$a_3' = a_3 + a_2$$

are four.
QR (3, 2),
ORO (3, 2),
QRR (3, 2, 1),
ORR (2, 3, 1).

Next, by referring to the transformations corresponding thereto in the TRANSFORMATION COMBINATION" field in FIG. 6, the transformation rule of the combination matrix 143 is referred. The transformation which can transform the combination matrix 143 into a binary matrix is only QR (3, 2).

Hence, the user can easily understand that the transformation QR (3, 2) should be applied.

The user enters a string "OR (3, 2)" representing the transformation applied next on the interactive input window 145 using the input apparatus 142.

Further, when the transformation part 104 of the feature transformation apparatus 101 stores the transformed combination matrix in the combination storage part 102 in the step S104, the transformation part 104 may store the combination matrices both before and after transformation, without overwriting the existing combination matrix and writing the transformed combination matrix to a different area, and may transform the combination matrix after (subjected to) the transformation back into the combination matrix before the transformation according to the user's input.

In this case, when selecting a transformation candidates from QR (3, 2), QRQ (3, 2), QRR (3, 2, 1), and QRR (2, 3, 1), the user sequentially enters these transformations, executes them, and sees if the transformed combination matrix 143 includes a negative number or a number of 2 or more.

When the transformed combination matrix 143 includes a negative number or a number of 2 or more, the user can choose the correct transformation more easily by transforming the combination matrix after transformation back into the one before transformation and repeating trials.

The display apparatus 141 may display all the information discussed above (143 to 145 in FIG. 8), or only a part thereof, but not limited to the above.

In FIG. 8, the feature transformation apparatus 101 may be directly connected to the display apparatus 141 and the input apparatus 142 or may be connected thereto via a communication line.

Further, the feature transformation apparatus 101 may comprise a transformation generation part, as in Example Embodiment 2 described later, acquire a transformation type and a parameter(s) generated by the transformation generation part, and perform a transformation. In this case, it is unnecessary to connect the feature transformation apparatus 101 to the input apparatus and the display apparatus.

Next, the effect of the feature transformation apparatus relating to the first example embodiment of the present invention will be described.

According to the first example embodiment of the present invention, it is possible to find a correct factorization easily even when a possible factorization is not unique. The reason for this is that it is easy to search a possible factorization under the condition where there exist a plurality of sets of possible factorizations, by executing the possible transformation with a transformation type and parameter(s) specified.

Example Embodiment 2

Next, a second example embodiment of the present invention will be described.

Figure 9:
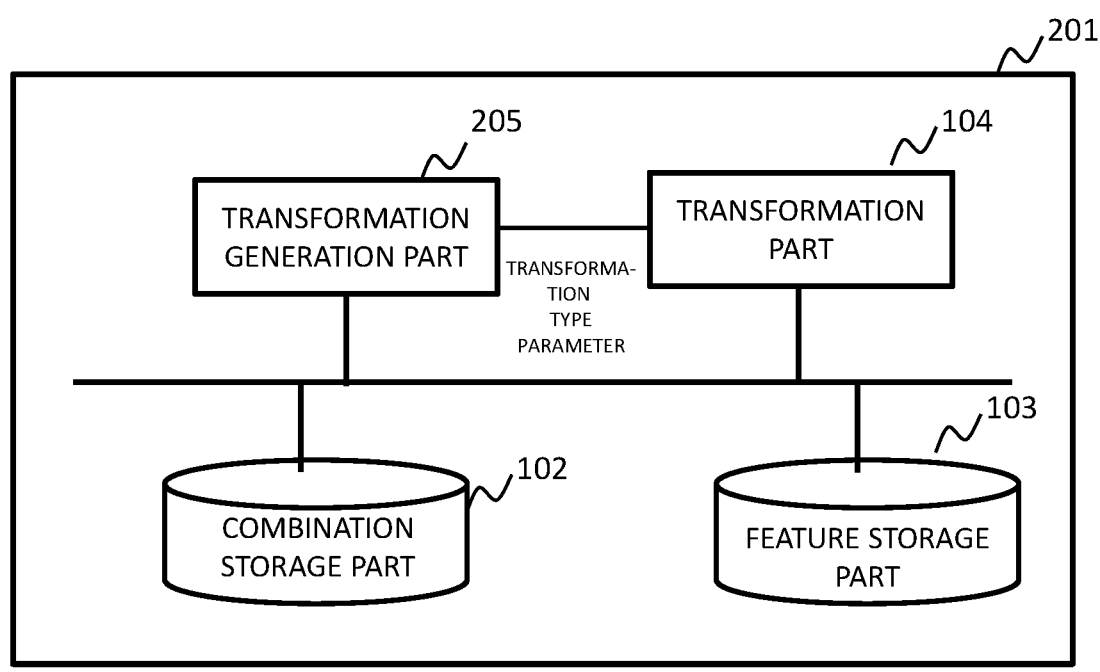
FIG. 9 is a diagram illustrating the configuration of a second example embodiment of the present invention.

FIG. 9 is a diagram illustrating a configuration example of a feature transformation apparatus 201 relating to Example Embodiment 2 of the present invention. In FIG. 9, the same elements as those in FIG. 1 have the same reference signs. The following mainly describes the differences between the first and the second example embodiments and the description of the identical parts thereof are omitted in order to avoid redundancy.

As shown in FIG. 9, the feature transformation apparatus 201 includes a transformation generation part 205 in addition to the combination storage part 102, the feature storage part 103, and the transformation part 104. The transformation generation part 205 generates a transformation type and a parameter(s) acquired by the transformation part 104.

Figure 10:
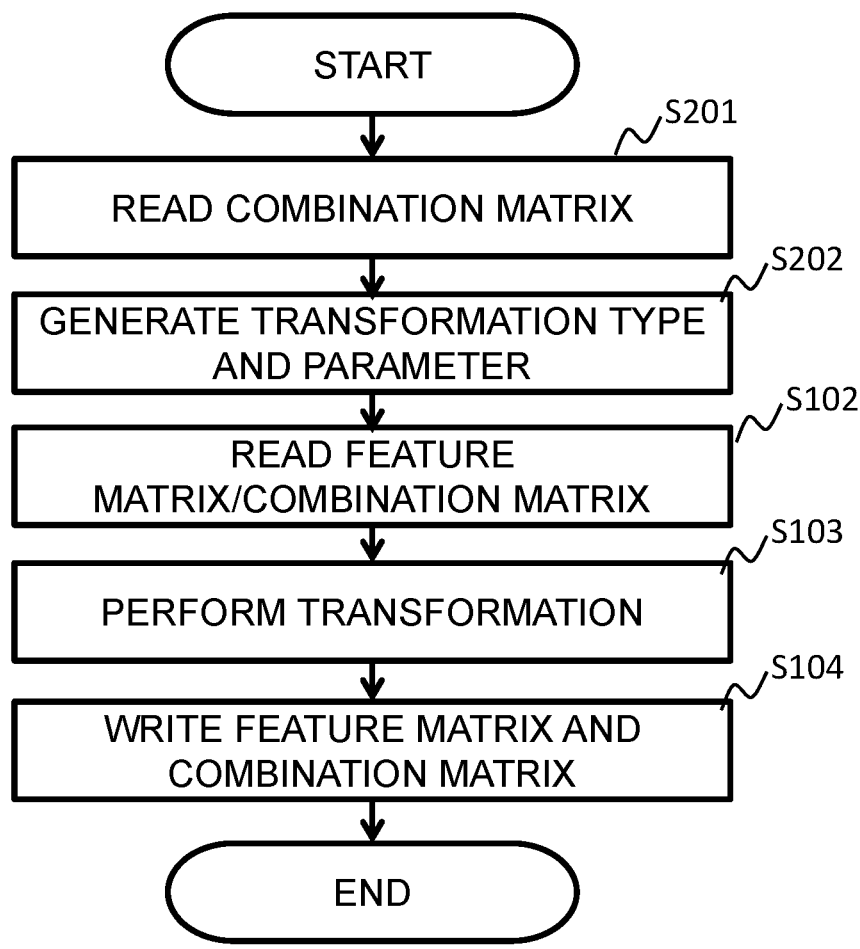
FIG. 10 is a flowchart describing an example of the processing procedure according to the second example embodiment of the present invention.

FIG. 10 is a flowchart describing an example of the processing procedure of the second example embodiment. In FIG. 10, the processing steps identical or equivalent to those in FIG. 4 have the same reference signs. The operation of the second example embodiment will be described with reference to FIG. 10.

First, the transformation generation part 205 reads the combination matrix stored in the combination storage part 102 (step S201).

Next, the transformation generation part 205 generates a transformation type and a parameter(s) using the read combination matrix (step S202).

As in Example Embodiment 1 described above, the transformation part 104 transforms the feature matrix and the combination matrix (both or one of them) using the transformation type and the parameter(s) generated by the transformation generation part 205 (the steps S102 to S104).

Here, the transformation part 104 may use, as the combination matrix read thereby in the step S102, the combination matrix as it is which is read by the transformation generation part 205 in the step S20.

The following describes the generation of a transformation type and a parameter(s) by the transformation generation part 205 in the step S202.

The transformation generation part 205 may generate a transformation based on an inclusive or comprise relationship between two occurrence vectors.

When the transformation matrix U is unimodular, in order for the transformation of Exp. 5 to be a possible transformation expressed by Exp. 8, the transformed combination matrix $Z'=ZU$ must be a binary matrix.

In the transformations of the types R, QR, and QRQ shown in FIG. 6, the value of the occurrence vector $z_j$ is transformed according to the parameters i, j. Therefore, the necessary and sufficient condition for these transformations to be possible ones expressed by Exp. 8 is that the transformed occurrence vector $z_j'$ is a binary vector (0-1 vector). Note that a binary vector is a vector having only 0 or 1 as components.

In the transformation $R_{ij}$, of the transformation type "R" in FIG. 6, on the combination matrix, the occurrence vector $z_i$ is added to the occurrence vector $z_j$.

That is, the necessary and sufficient condition for the transformed occurrence vector $z_j'$ to be a binary vector is that a component in $z_i$ and the corresponding component in $z_j$ are not simultaneously 1. This condition is equivalent to a subscript set $S(z_i)$ with $z_i$ as an indicator function and a subscript set $S(z_j)$ with $z_j$ as an indicator function being mutually prime (having no common part).

$$S(z_i) \perp S(z_j)$$

Here, a subscript set S(z) with a binary vector z as an indicator function is a set of subscripts (indexes) of components whose value is 1 among components of z. For example, when z=(1, 0, 0, 1,0, 1), S(z)={1, 4, 6}.

In the transformation $Q_j R_{ij}$, of the transformation type "QR" in FIG. 6, on the combination matrix, the difference between the occurrence vector $z_i$ and the occurrence vector $z_j$ is substituted into $z_j$. Hence, the necessary and sufficient condition for the transformed occurrence vector $z_j'$ to be a binary vector is that, when a component in $z_i$ is 1, the corresponding component in $z_j$ is also 1.

That is, this condition is equivalent to the subscript set $S(z_i)$ with $z_i$ as an indicator function including the subscript set $S(z_j)$ with $z_j$ as an indicator function.

$$S(z_i) \supset S(z_j)$$

In the transformation $Q_j R_{ij} Q_j$, of the transformation type "QRQ" in FIG. 6, on the combination matrix, the occurrence vector $z_i$ is subtracted from the occurrence vector $z_j$. Therefore, the necessary and sufficient condition for the transformed occurrence vector $z_j'$ to be a binary vector is that, when a component in $z_j$ is 1, the corresponding component in $z_i$ is also 1. That is, this condition is equivalent to the subscript set $S(z_i)$ with $z_i$ as an indicator function being included in the subscript set $S(z_j)$ with $z_j$ as an indicator function.

$$S(z_i) \subset S(z_j)$$

One can determine whether or not the conditions above are met as follows using a matrix $W=Z^T Z$ calculated from the combination matrix.

(1) Condition $S(z_i) \perp S(z_j) \Leftrightarrow W_{ij}=0$ (2) Condition $S(z_i) \supset S(z_j) \Leftrightarrow W_{ij}=W_{jj}$ (3) Condition $S(z_i) \subset S(z_j) \Leftrightarrow W_{ij}=W_{ii}$ \hfill (Exp. 28)

As described, by calculating the matrix $W=Z^T Z$ for each set of i, j and deciding on a transformation type according to a satisfied condition out of the conditions (1) to (3) above, a possible transformation expressed by Exp. 8 can be generated. In this case, in the step S202, the transformation generation part 205 calculates the values of the matrix $W_{ij}$ for i, j=1, . . . , K (i≠j) from the combination matrix Z read in the step S201, and when any of the conditions (1) to (3) is met, the transformation generation part 205 generates a transformation according to the satisfied condition.

That is, for a set of i and j, when the condition (1) $W_{ij}=0$ is met, the transformation type R and the parameters i, j are generated.

Further, for a set of i and j, when the condition (2) $W_{ij}=W_{jj}$ is met, the transformation type QR and the parameters i, j are generated.

Further, for a set of i and j, when the condition (3) $W_{ij}=W_{ii}$ is met, the transformation type QRQ and the parameters i and j are generated.

When a plurality of sets of the parameters i and j meeting any of the conditions (1) to (3) exist, the transformation generation part 205 may generate a transformation by randomly selecting the parameters i, j from the parameters meeting the condition and choosing the transformation type corresponding to the condition satisfied by i, j from the conditions (1) to (3).

The transformation generation part 205 may generate a transformation by combining the transformations of the types R, QR, and QRQ in the step S202.

When a transformation combining the transformations of R, QR, and QRQ in "TRANSFORMATION TYPE" in FIG. 6 is generated, many possible transformations can be generated by sequentially applying transformations meeting any of the conditions (1) to (3).

Figure 11:
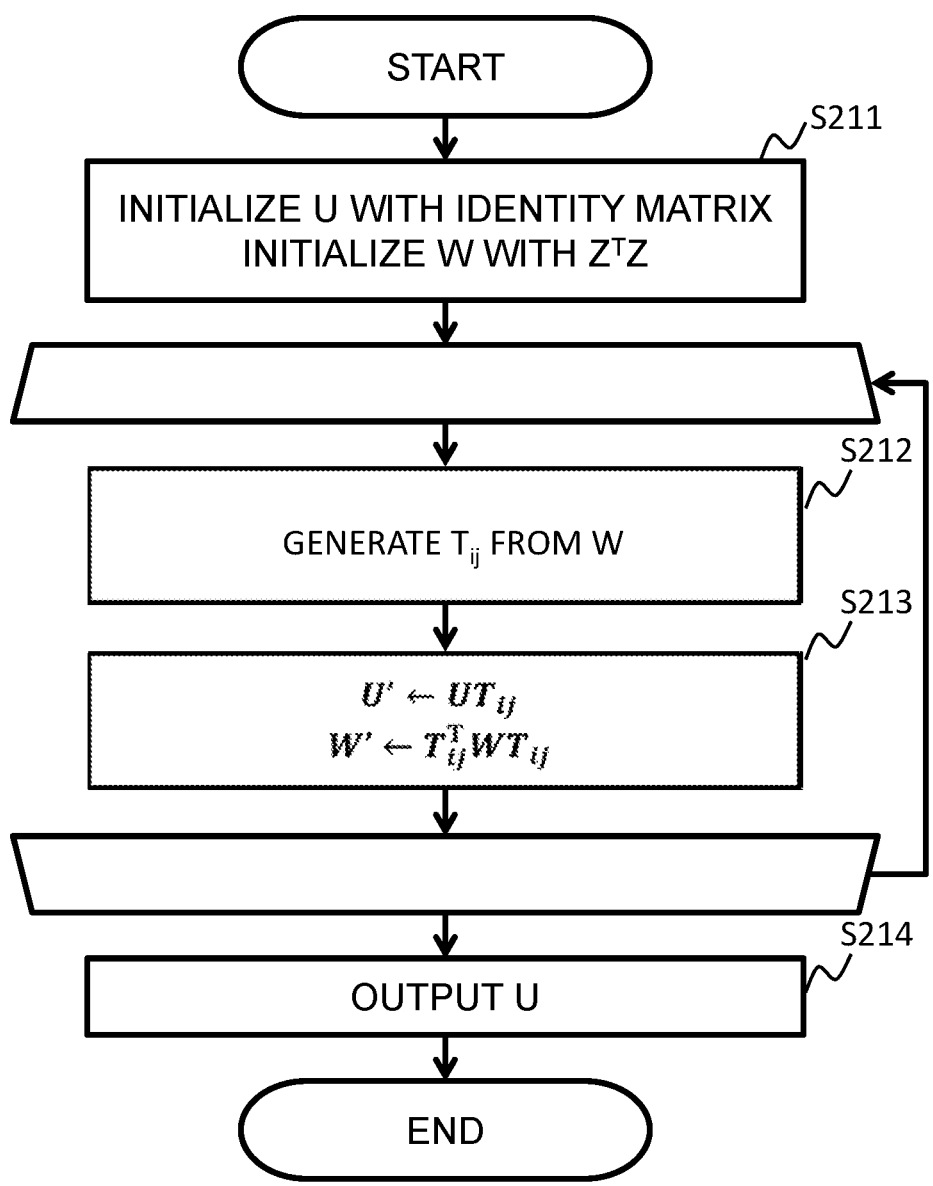
FIG. 11 is a flowchart describing an example of the processing procedure according to the second example embodiment of the present invention.

FIG. 11 is a flowchart describing the operation of the transformation generation part 205 in the step S202 in this case.

The transformation generation part 205 initializes the transformation matrix U with an identity matrix (unit matrix) I and configures (initializes) the matrix W into $Z^T Z$ from the combination matrix Z (step S211).

Next, the transformation generation part 205 generates from the matrix W a transformation represented by a transformation matrix $T_{ij}$ using the conditions (1) to (3) above (S212). Here, $T_{ij}$ is any one of the following.

$$R_{ij},$$

$$Q_j R_{ij}$$

$$Q_j R_{ij} Q_j \quad \text{(Exp. 29)}$$

Further, the transformation generation part 205 updates U and W using the following Exp. 30 and Exp. 31, respectively (step S213).

$$U' = U T_{ij} \quad \text{(Exp. 30)}$$

$$W' = T_{ij}^T W T_{ij} \quad \text{(Exp. 31)}$$

After repeating the steps S212 and S213 a predetermined number of times or a randomly obtained number of times, the transformation generation part 205 outputs the unimodular matrix as the "transformation type" ("TRANSFORMATION TYPE" in FIG. 6: "Unimodular") and the matrix U as the parameter.

As described, the transformation generation part 205 generates a transformation (unimodular matrix U) expressed by Exp. 8 by combining the transformations of the types R, QR, and QRQ.

Further, by updating the W matrix using Exp. 30 and Exp. 31 in the step S213, the W matrix can be calculated with a smaller amount of calculation than calculating W at each iteration using the definition of W.

$$W = Z^T Z \quad \text{(Exp. 32)}$$

As a matter of fact, While the calculation amount of the definition of W ($W = Z^T Z$) is in the order of $O(NK^2)$, the calculation amount required to update W using Exp. 30 and Exp. 31 is in the order of $O(K)$.

Further, in the step S202, the transformation generation part 205 may perform the generation using a random number. When ZU is an integer matrix, the condition $0 \leq Z \leq 1$ in Exp. 8 can be rewritten to an equivalent condition using function f defines by the following equation.

$$f(ZU) = 0 \quad \text{(Exp. 33)}$$

$$f(Z) = \frac{1}{2} \sum_{i,j} z_{i,j}(z_{i,j} - 1) \quad \text{(Exp. 34)}$$

That is, a set H(Z) of the possible transformation matrices U expressed by Exp. 8 is equivalent to the following equation.

$$H(Z) = \{U | U \text{ is a unimodular matrix} \wedge f(ZU) = 0\} \quad \text{(Exp. 35)}$$

Further, when ZU is an integer matrix, $$f(ZU) \geq 0,$$

and when
U=I (identity matrix),
f (ZU)=0. Therefore.
minimizing f (ZU) is equivalent to f (ZU)=0.

Therefore, among the unimodular matrices U, a possible transformation can be generated with a higher probability by using a random number, from a probability distribution having the higher probability, as the smaller the value of (ZU) is, for example.

Here, the distribution defined as follows is used as the probability distribution having the higher probability, as the smaller the value of (ZU) is.

$$P(U) = \frac{\exp\{-\beta f(ZU)\}}{\sum_U \exp\{-\beta f(ZU)\}} \quad \text{(Exp. 36)}$$

where, β positive real parameter. As a transformation generated from the probability distribution expressed by Exp. 6, here, let's consider a transformation that only changes an occurrence vector $Z_m$ in the combination matrix Z, in particular.

As described in the first example embodiment, all the possible transformations expressed by Exp. 8 (therefor, Exp. 35) are represented by combinations of the transformations Q and R shown in "TRANSFORMATION TYPE" in FIG. 6. In particular, the transformation only changing an occurrence vector $Z_m$ can be expressed by a combination of transformations in, a form of $$Q_m \text{ and } R_{i,m} \ (i=1, \ldots, K).$$

Further, due to the fact that, for each i, j, $R_{i,m}$ and $R_{j,m}$ are commutative ($R_{i,m} R_{j,m} = R_{j,m} R_{i,m}$) and an inverse transformation of $R_{i,m}$ is $Q_m R_i$, $_m Q_m$ ($R_{i,m}^{-1} = Q_m R_{i,m} Q_m$), all the possible transformations (the transformation matrices U) that only change the occurrence vector $Z_m$ are uniquely expressed as follows, using variables r, $s_1, \ldots, s_{m-1}, s_{m+1}, \ldots, s_K$.

$$U = Q_m^r R_{1m}^{s_1} \ldots R_{m-1,m}^{s_{m-1}} R_{m+1,m}^{s_{m+1}} \ldots R_{K,m}^{s_K} = \begin{bmatrix} 1 & & s_1 & & 1 \\ & \ddots & \vdots & & \\ & & 1 & s_{m-1} & \\ & & (-1)^r & & \\ & & s_{m+1} & 1 & \\ & & \vdots & & \ddots \\ & & s_K & & 1 \end{bmatrix} \quad \text{(Exp. 37)}$$

It is noted that r=0, 1, and $s_1, \ldots, s_{m31-1}, s_{m+1}, \ldots, s_K$ are arbitrary integers. The following represents K-1 variables $s_1, \ldots, s_{m-1}, s_{m+1}, \ldots, s_K$ using K-dimensional integer vector $s = (s_1, \ldots, s_K)$ (where $s_m = 0$).

When the transformation matrix U is expressed by Exp. 37, the value of f (ZU) is expressed as follows.

$$f(ZU) = \frac{1}{2}s^T W s + s^T \left( (-1)^r W e_m - \frac{1}{2}\mathrm{diag}(W) \right) + tW_{m,m} \quad \text{(Exp. 38)}$$

where, $e_m$ is a vector in which the m-th component is 1 and the remaining components are all 0.

diag (W) is a vector of diagonal components of W.

By using Exp. 38 P (U) the distribution of U expressed by Exp. 36, is given by Exp. 39, $$P(U) \propto \exp\left\{ -\frac{\beta}{2}(s - \mu_t)^T W(s - \mu_t) \right\}, \quad \text{(Exp. 39)}$$

$$\mu_t = W^{-1}\left( (-1)^r W e_m - \frac{1}{2}\mathrm{diag}(W) \right)$$

In Exp. 39, when approximated with t fixed and relaxed from an integer vector to a real vector, the distribution P(U) in Exp. 39 becomes a normal distribution with a mean $\mu_t$ and a covariance $(\beta W)^{-1}$ with respect to s.

In the step S202 in FIG. 10, the transformation generation part 205 generates the variable m by a random number from integers of 1 to K and the variable r by a random number from 0 or 1, respectively.

Next, the transformation generation part 205 generates the integer vector s by performing sampling from a conditional normal distribution with the mean $\mu_t$ and the covariance $(\beta W)^{-1}$, and with the m-th component $s_m$ fixed at 0, and further rounding the sampled value to an integer.

Next, the transformation generation part 205 generates "the transformation type": Unimodular and "parameter": U as shown in FIG. 6 by calculating the unimodular matrix U using Exp. 37 from the generated r and s.

Alternatively, the transformation generation part 205 may generate a transformation r times (zero times or one time) expressed by "transformation type": Q and "parameter": m shown in FIG. 6 from the generated r and s and may generate a transformation in which transformations expressed by: for i=1, . . . , K,
when $s_i$>0, "transformation type": R,
when $s_i$<0", transformation type": QRQ,
with the parameters i and m.
are combined $|s_i|$ times each.

Alternatively, from the generated s, the transformation generation part 205 may generate a transformation by combining the transformations of "transformation type": R-parity and "parameter": i, m, for i with $s_i$ not divisible by 2, out of i=1 to K.

By performing a transformation as described above, a possible transformation expressed by Exp. 8 (i.e., Exp. 35) can be generated with a high probability.

Next, the effect of the feature transformation apparatus relating to the second example embodiment of the present invention will be described. According to (the second example embodiment of the present invention, the transformation generation part 205 automatically generates a possible transformation. A user does not have to manually generate a transformation which the transformation part 104 obtains. As a result, an accurate factorization can be found more easily than in the first example embodiment even when a possible factorization is not unique.

Example Embodiment 3

Next, a third example embodiment of the present invention will be described. In the third example embodiment, in a case a possible factorization of X~=ZA is not unique, the most suitable solution is searched through a plurality of sets of possible factorizations by repealing the transformation processing described in the second example embodiment.

Figure 12:
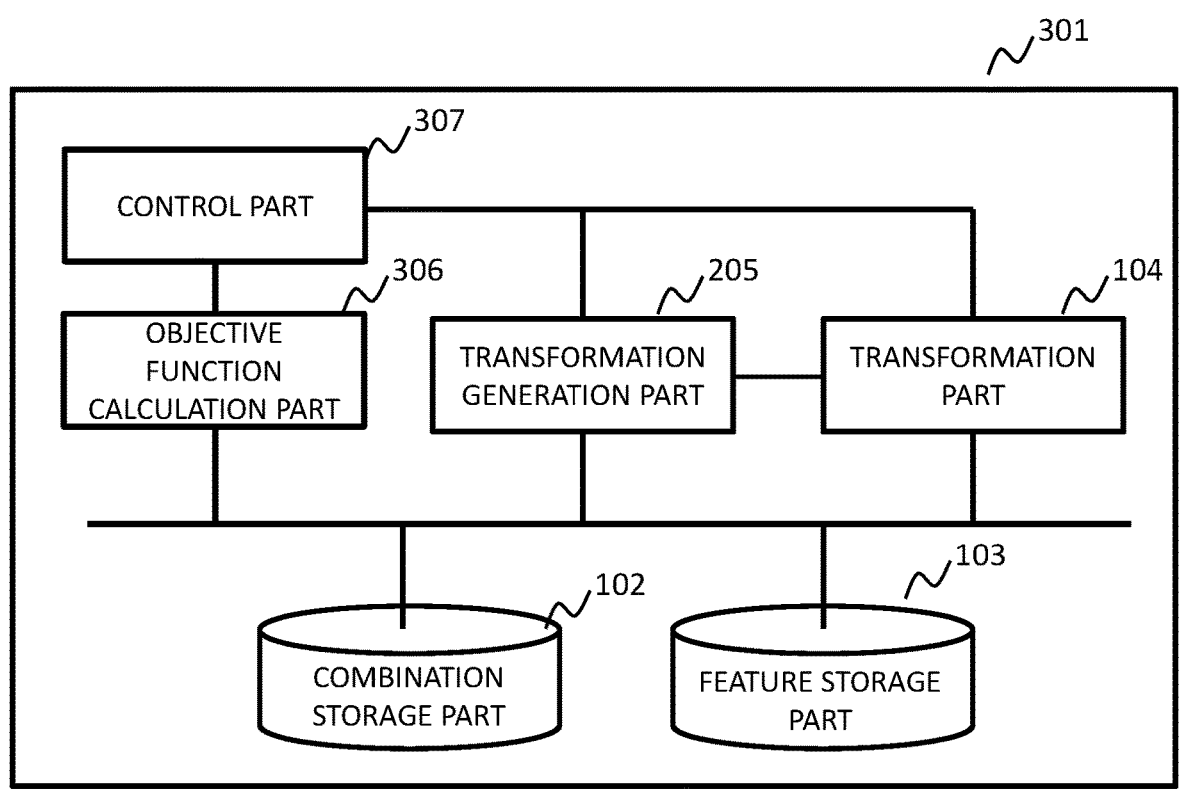
FIG. 12 is a diagram illustrating the configuration of a third example embodiment of the present invention.

FIG. 12 is a diagram illustrating a configuration example of a feature transformation apparatus 301 relating to the third example embodiment of the present invention. In FIG. 12, the same elements as those in FIGS. 1 and 9 have the same reference signs. The following mainly describes the differences between the second and the third example embodiments and the description of the identical parts thereof are omitted in order to avoid redundancy.

Referring to FIG. 12, the feature transformation apparatus 301 includes an objective function calculation part 306 and a control part 307, in addition to the combination storage part 102, the feature storage part 103, the transformation part 104, and the transformation generation part 205.

The objective function calculation part 306 calculates a value of an objective function from the combination matrix 112 stored in the combination storage part 102 and the feature matrix 111 stored in the feature storage part 103 (both or one of them).

The control part 307 controls and repeatedly executes the operation of the transformation generation part 205 and the transformation part 104 based on the objective function value calculated by the objective function calculation part 306.

With such a configuration, the feature transformation apparatus 301 is enabled to automatically achieve the optimal objective function value by repeatedly applying transformations so as to optimize the objective function value.

Figure 13:
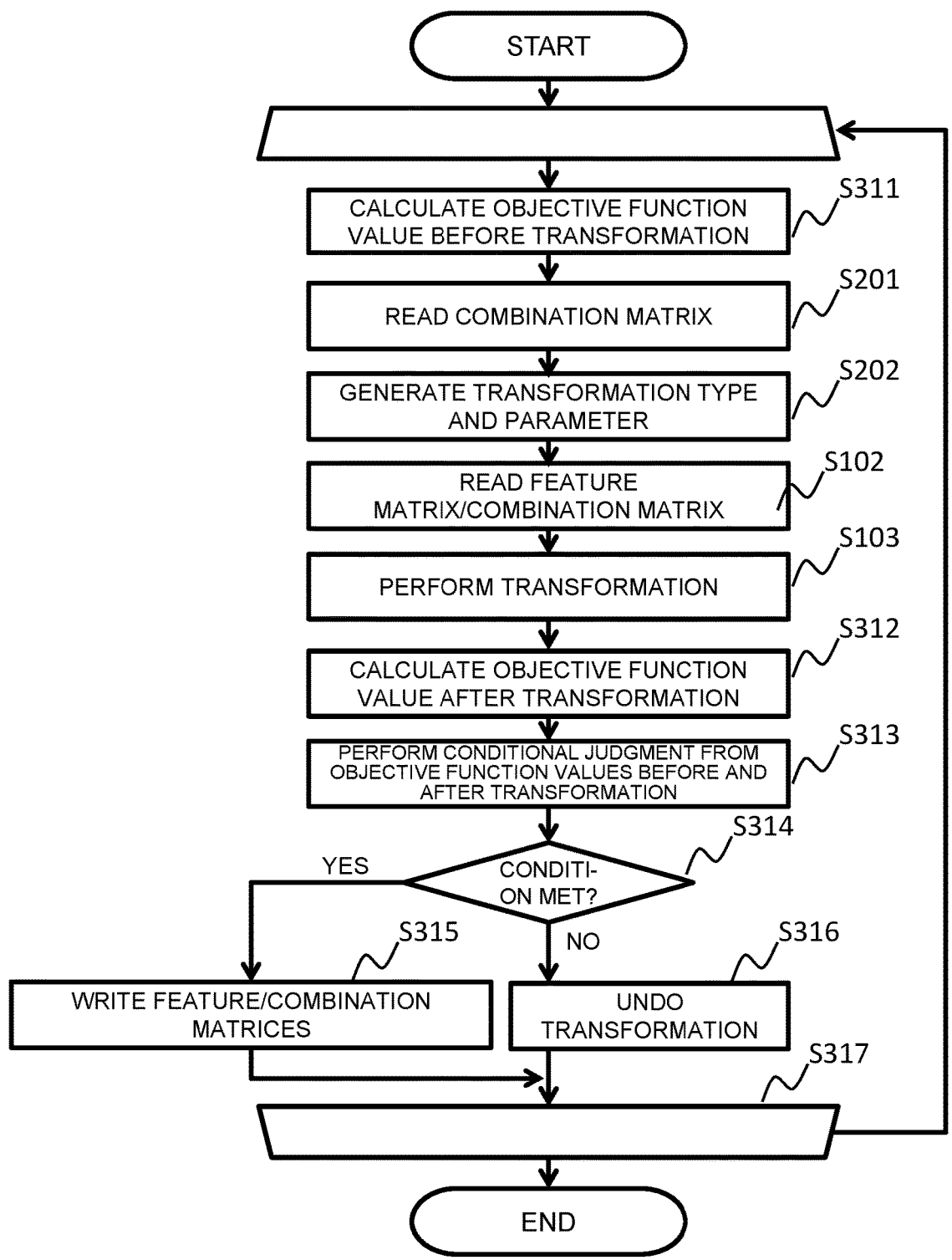
FIG. 13 is a flowchart describing an example of the processing procedure according to the third example embodiment of the present invention.

FIG. 13 is a flowchart describing the processing procedure of the third example embodiment. In FIG. 13, the processing steps identical or equivalent to those in FIG. 10 have the same reference signs. The operation of the third example embodiment will be described with reference to FIG. 13.

First, the objective function calculation part 306 calculates the value of an objective function from the combination matrix 112 stored in the combination storage part 102 and the feature matrix 111 stored in the feature storage part 103 (both or one of them) (step S311).

Next, the transformation generation part 205 and the transformation part 104 transform at least one of the combination matrix and the feature matrix as described in Example Embodiment 2 (the steps S201, S202, S102, and S103).

Next, the objective function calculation part 306 calculates an objective function value from the transformed combination matrix 112 and the transformed feature matrix 111 (both or one of them) (S312).

The control part 307 compares the objective function values before and after transformation calculated by the objective function calculation part 306 in the steps S311 and S312, and performs conditional judgment as to whether to keep the transformation (storing the combination and feature matrices after transformation) or undo the transformation (keeping the combination and feature matrices before transformation), depending on whether or not the transformation improves the objective function (step S313).

Depending on this condition, the combination matrix 112 and the feature matrix 111 after transformation (both or one of them) are written to the combination storage part 102 and/or the feature storage part 103 (step S315) or the applied transformation is undone while the combination matrix 112 and the feature matrix 111 before transformation are kept (step S316).

Further, the control part 307 repeats the steps S311 to S315/S316 a predetermined number of times or until the objective function values converge (step S317).

In each iteration of the steps S311 to S315/S316, the value of the objective function either improves (when the step S315 is executed) or does not change (when the step S316 is executed).

Therefore, by repeating the steps above, (Z, A) which optimizes the objective function can be used from a plurality of sets of possible factorization candidates (Z, A), (Z', A'), ... of X~=ZA=Z'A' ....

Here, regarding the objective function value calculated by the objective function calculation part 306 in the step S311, in the cases of the second and subsequent iterations of the step S317, the calculation may be omitted by using the objective function value already calculated in the preceding iteration.

That is, if the step S315 is executed and the combination and feature matrices after transformation are written in a preceding iteration, the objective function value calculated in the step S311 in a current iteration will be identical to the one calculated in the step S313 in the previous iteration. As a result, recalculation can be omitted by holding the calculated value.

If the step S316 is executed and the combination and feature matrices after transformation are kept in the preceding iteration, the objective function value calculated in the step S311 in the current iteration will be identical to the one calculated in the step S311 in the previous iteration. As a result, recalculation can be omitted by holding the calculated value.

The objective function value calculated by the objective function calculation part 306 may be the matrix norm of the feature matrix. Here, for the matrix norm |A| of A, an arbitrary matrix norm such as the Frobenius norm (a square root of a squared sum of components) and the L1 norm (a sum of magnitudes of components) may be used.

A method for selecting the most suitable feature matrix A from the "possible transformations", is selecting one having a feature vector of a norm with a value as small as possible.

The reason for this is that data represented by a combination of feature vectors whose values are unnecessarily large will include redundant information, compared with data represented by a combination of feature vectors with minimum values, and the interpretability of the results is deemed low. As a matter of fact, in the example of FIG. 15 described above, the feature matrix $A_1$ constituted by the features 13 and 14 in the possibility 1 has smaller Frobenius norm and L1 norm than the feature matrix $A_2$ constituted by the features 15 and 16 in the possibility 2 ($|A_1|<|A_2|$).

This is because, in the possibility 2, the feature 16 has the same shape as the one found in the feature 15 and redundant information is included, while the possibility 1 does not include such redundant information.

Therefore, by deriving a factorization that decreases a norm of the feature matrix, a more suitable solution (e.g., the possibility 1 in FIG. 15) can be obtained.

In this case, the matrix norm |A| of the feature matrix A is used as the objective function value calculated by the objective function calculation part 306.

By controlling the transformation generation part 205 and the transformation part 104 to iteratively execute transformations so that the objective function value after the transformation is smaller than the one before, the control part 307 can obtain the solution with the smallest feature vector from possible factorizations of X~.

Further, the objective function value calculated by the objective function calculation part 306 may be a total sum of number of times of changes in the occurrence vector.

For example, when data is time-series information such as waveform data measured at a plurality of times, a combination of features appearing at a certain time is expected to be similar to a combination of features appearing at a next time period. In such a case where occurrence vector components are conceived to be correlated with each other, the most suitable combination matrix is expected to have the least change in components of the occurrence vector.

In this case, as the objective function value calculated by the function calculation part 306, a variation amount of the combination matrix Z expressed by the following equation is used.

$$\sum_{k=1}^{K}\sum_{n=1}^{N-1}|Z_{n+1,k} - Z_{n,k}| \qquad \text{(Exp. 40)}$$

By controlling the transformation generation part 205 and the transformation part 104 to iteratively execute transformations so that the objective function value after the transformation is smaller than the one before, the control part 307 can obtain the solution with the smallest change in the occurrence vector out of possible factorizations of X~.

Next, the effect of the third example embodiment of the present invention will be described. According to the third example embodiment of the present invention, a factorization that optimizes an objective function is automatically searched for from among a plurality of sets of possible factorization candidates. As a result, a suitable factorization can be found easily even when a possible factorization is not unique.

Figure 14:
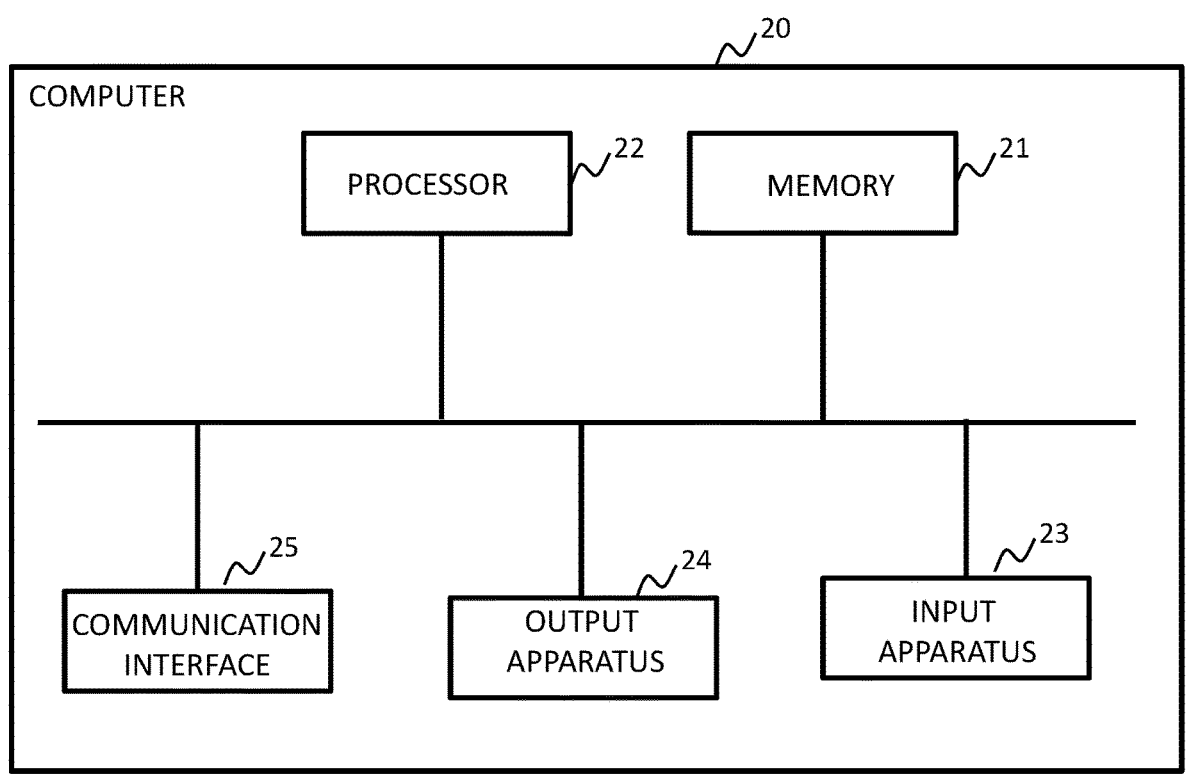
FIG. 14 is a diagram illustrating the configuration of a fourth example embodiment of the present invention.

The following describes a configuration example of hardware resources when any one of the feature transformation apparatuses 101, 201, and 301 relating to each example embodiment is realized using a computation processing apparatus (information processing apparatus; computer). It is noted that the feature transformation apparatuses 101, 201, and 301 may be realized physically or functionally using a plurality of at least two computers. Further, the feature transformation apparatuses 101, 201, and 301 may be realized as dedicated apparatuses FIG. 14 is a block diagram schematically showing a hardware configuration example of a computer 20 capable of realizing the feature transformation apparatuses 101, 201, and 301. The computer 20 includes a memory 21 and a processor 22, and includes at least one of an input apparatus 23, an output apparatus 24, and a communication interface 25 as necessary. The computer 20 may not include any of the input apparatus 23, the output apparatus 24, and the communication interface 25.

The memory 21 stores a program (feature transformation program) that includes instructions executed by the processor 22. The memory 21 may be constituted by a combination of a volatile memory and a non-volatile memory. The memory 21 may be directly connected to the processor 22 or connected thereto is a bus. The memory 21 may constitute an auxiliary storage apparatus and include a storage apparatus such as an HDD provided apart from the processor 22. In this case, the processor 22 may access the memory 21 via an input/output interface not shown. The memory 21 may include the combination storage part 102 and the feature storage part 103.

Various types of non-transitory computer-readable media may be used to store the program (feature transformation program) and provide it to the computer. The non-transitory computer-readable media include various types of tangible storage media. Examples of the non-transitory computer-readable media include magnetic recording medium (for example flexible disk magnetic tape, and hard disk drive), magneto-optical recording medium (for example magneto-optical disk), Compact Disc Read-Only Memory (CD-ROM), CD-R, CD-R/W, and semiconductor memory (for example mask ROM. Programmable ROM (PROM), Erasable PROM (EPROM), and Flash ROM Random Access Memory (RAM)). Further, the program (feature transformation program) may be supplied to the computer by various types of transitory computer-readable media. Examples of the transitory computer-readable media include electrical signal, optical signal, and electromagnetic wave. The transitory computer-readable medium supplies the program (feature transformation program) to the computer via a wired communication channel such as an electrical wire and optical fiber, or a wireless communication channel. The program (feature transformation program) may include transformation processes corresponding to some or all of the transformation types represented in any one of the table 131 in FIG. 6, the table 132 in FIG. 7, Exp. 26 and Exp. 27. When there is only one transformation type, the program may include only one applicable type of transformation processing.

The processor 22 performs the processes of the constituent elements such as the transformation part 104, the transformation generation part 205, the objective function calculation part 306, and the control part 307 in FIGS. 1, 9, and 12 by reading the computer program (instructions) from the memory 21 and executing the program. For example, the processor 22 may be a CPU (Central Processing Unit) or MPU (Micro Processing Unit). The processor 22 may include a plurality of processors. The input apparatus 23 is, for example, a keyboard and receives input of information. In Example Embodiment 1, the input apparatus 142 is realized by the input apparatus 23. The output apparatus 24 is, for example, a display and outputs information.

In the first example embodiment described above, the display apparatus 141 is realized by the output apparatus 24. For example, the communication interface 25 is a network interface card (NIC), and is used to communicate with another apparatus via a wired or wireless network. In Example Embodiment 1, the transformation part 104 may acquire a transformation type and a parameter via the communication interface 25.

Further, each of the example embodiments, the combination matrix stored in the combination storage part 102 and the feature matrix stored in the feature storage part 103 may be supplied the communication interface 25. These may be supplied to the computer 20 the input apparatus 23. The combination matrix and the feature matrix transformed by the transformation part 104 may be outputted to the output apparatus 24. Further, these results may be transmitted to another apparatus via the communication interface 25.

Further, each disclosure of Patent Literature 1 and Non-Patent Literature 1 cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select a wide variety of the disclosed elements (including the individual elements of the individual Supplementary Notes, the individual elements of the individual examples, and the individual elements of the individual figures) within the scope of the Claims of the present invention. That is, it is self-explanatory that the present invention includes any types of variations and modifications to be done by a skilled person according to the whole disclosure including the Claims, and the technical concept of the present invention.

A part or all of the above described example embodiments can be described as the following Supplementary Notes, though not limited thereto.

(Supplementary Note 1)

A feature transformation apparatus comprising:

at least a combination storage part that stores a combination with respect to a set of features, wherein data is approximately represented as a sum of the combination of the features; and a transformation part that transforms at least the combination so as not to change the sum of the combination of the set of features (Supplementary Note 2)

The feature transformation apparatus according to Supplementary Note 1 further comprising a feature storage part that stores the set of features, wherein the transformation part transforms the combination and the features so as not to change the sum of the combination of the set of features.

(Supplementary Note 3)

The feature transformation apparatus according to Supplementary Note 2, wherein the combination storage part holds the combination in a binary matrix format indicating whether or not each feature appears in the data, and the transformation part transforms the combination by multiplying the binary matrix by a regular matrix.

(Supplementary Note 4)

The feature transformation apparatus according to Supplementary Note 3, wherein the feature storage part holds the set of features in a matrix format, and the transformation part transforms the features by multiplying an inverse matrix of the regular matrix.

(Supplementary Note 5)

The feature transformation apparatus according to Supplementary Note 3 or 4, wherein the regular matrix is a unimodular matrix.

(Supplementary Note 6)

The feature transformation apparatus according to any one of Supplementary Notes 1 to 5, wherein the transformation part transforms the combination using any one of the following transformations:

(a1) transformation that inverts a sign of occurrence of a first feature;

(a2) transformation that adds the occurrence of a second feature to the occurrence of the first feature:

(a3) transformation that subtracts the occurrence of the first feature from the occurrence of the second feature and substitutes the result into the occurrence of the first feature;

(a4) transformation that subtracts the occurrence of the second feature from the occurrence of the first feature; and (a5) transformation that subtracts the occurrence of the first feature from the sum of the occurrence of the second feature and the occurrence of a third feature, and substitutes the result into the occurrence of the first feature, or through a transformation that combines a plurality of the transformations (a1) to (a5) and applies them sequentially, and the first to the third features in each of the transformations (a1) to (a5) are variably set in each of the transformations.

(Supplementary Note 7)

The feature transformation apparatus according to Supplementary Note 2 or 4, wherein the transformation part transforms the features using any one of the following transformations:

(b1) transformation that inverts the sign of a first feature;
(b2) transformation that subtracts a second feature from the first feature:
(b3) transformation that adds the second feature to the first feature and inverts the sign of the second feature;
(b4) transformation that adds the second feature to the first feature; and
(b5) transformation that substitutes the addition of the first and the second features and the addition of the first feature and a third feature into the second and the third features and inverts the sign of the first feature:
or through a transformation that combines a plurality of the transformations (b1) to (b5) and applies them sequentially, and the first to the third features in each of the transformations (b1) to (b5) are variably set in each of the transformations.

(Supplementary Note 8)

The feature transformation apparatus according to any one of Supplementary Notes 1 to 7, wherein the transformation part further performs a rounding transformation that rounds the values of the combination to 0 or 1 in addition to the transformation of the combination.

(Supplementary Note 9)

The feature transformation apparatus according to Supplementary Note 8, wherein the transformation part performs one of the following as the rounding transformation:

transforming the combination by rounding a value in the combination to 0 or 1 when the value is other than 0 or 1; and transforming the combination by performing modulo 2 on a value in the combination when the value is other than 0 or 1.

(Supplementary Note 10)

The feature transformation apparatus according to Supplementary Note 1, wherein the transformation part transforms the combination using a transformation that performs an exclusive-OR addition on occurrences of a first feature and occurrences of a second feature or through a transformation that combines a plurality of the exclusive-OR, additions and applies them sequentially.

(Supplementary Note 11)

The feature transformation apparatus according to any one of Supplementary Notes 2, 4, and 7, wherein the transformation part derives, as the feature transformation, the feature set the feature set after the transformation, based on optimization using a distance between the sum of the combination after the transformation with respect to the feature set after the transformation and the sum of the combination before the transformation with respect to the feature set before the transformation.

(Supplementary Note 12)

The feature transformation apparatus according to any one of Supplementary Notes 1 to 11, wherein the transformation part acquires a transformation type and a parameter to decide on the transformation.

(Supplementary Note 13)

The feature transformation apparatus according to Supplementary Note 12, further comprising a transformation generation part that generates the transformation type and the parameter.

(Supplementary Note 14)

The feature transformation apparatus according to Supplementary Note 13, wherein the transformation generation part determines the transformation type based on an inclusive or comprise relationship, with respect to each value of the parameter, between occurrence of a first feature and occurrence of a second feature, out of features defined by the parameter and generates the transformation type and the parameter.

(Supplementary Note 15)

The feature transformation apparatus according to Supplementary Note 14, wherein the transformation generation part generates a product of unimodular matrices as the transformation type and a parameter, which is a unimodular matrix, using a random number so that the combination matrix after the transformation becomes a binary matrix with a probability higher than a predetermined value.

(Supplementary Note 16)

The feature transformation apparatus according to any one of Supplementary Notes 13 to 15, further comprising:

an objective function calculation part that calculates an objective function using the combination or both the combination and the features; and a control part that controls the transformation part to maximize or minimize the objective function.

(Supplementary Note 17)

The feature transformation apparatus according to Supplementary Note 16, wherein the objective function is the matrix norm of the features expressed in matrix form or the total number of times of changes of occurrences in the combination.

(Supplementary Note 18)

The feature transformation apparatus according to Supplementary Note 16 or 17, wherein the control part executes the transformation if the value of the objective function after the transformation by the transformation part improves more than before the transformation.

(Supplementary Note 19)

The feature transformation apparatus according to any one of Supplementary Notes 1 to 18, wherein the data includes at least one of time-domain signal waveform, frequency-domain spectrum, feature values of time-domain signal waveform, the number of occurrences of an event, and image.

(Supplementary Note 20)

A feature transformation method of a computer, the feature transformation method including:

accessing a combination storage part that stores a combination with respect to a set of features, wherein data is approximately represented as a sum of the combination of the features; and transforming at least the combination so as not to change the sum of the combination of the set of features.

(Supplementary Note 21)

A recording medium (program) causing a computer comprising at least a combination storage part that stores a combination with respect to a set of features, wherein data is approximately represented as a sum of the combination of the features to execute processing comprising transforming at least the combination so as not to change the sum of the combination of the set of features.

What is claimed is:

1. A feature transformation apparatus comprising:
a processor;
a memory storing program instructions executable by the processor; and a combination storage part that stores a combination with respect to a set of features, wherein data is approximately represented as a sum of the combination of the features, wherein the processor, when executing the program instructions stored in the memory, accesses the combination stored in the combination storage part and transforms at least the combination so as not to change the sum of the combination of the set of features.

2. The feature transformation apparatus according to claim 1, further comprising a feature storage part that stores the set of features, wherein the processor accesses the set of features stored in the feature storage part and transforms the combination and the features so as not to change the sum of the combination of the set of features.

3. The feature transformation apparatus according to claim 2, wherein the combination storage part holds the combination in a binary matrix format indicating whether or not each feature appears in the data, and the processor transforms the combination by multiplying the binary matrix by a regular matrix.

4. The feature transformation apparatus according to claim 3, wherein the feature storage part holds the set of features in a matrix format, and the processor transforms the features by multiplying an inverse matrix of the regular matrix.

5. The feature transformation apparatus according to claim 3, wherein the regular matrix is a unimodular matrix.

6. The feature transformation apparatus according to claim 1, wherein the processor transforms the combination using any one of the following transformations:

(a1) transformation that inverts a sign of an occurrence of a first feature;

(a2) transformation that adds an occurrence of a second feature to the occurrence of the first feature;

(a3) transformation that subtracts the occurrence of the first feature from the occurrence of the second feature and substitutes the result for the occurrence of the first feature;

(a4) transformation that subtracts the occurrence of the second feature from the occurrence of the first feature; and (a5) transformation that subtracts the occurrence of the first feature from the sum of the occurrence of the second feature and the occurrence of a third feature, and substitutes the result for the occurrence of the first feature;

or using a transformation that combines a plurality of the transformations out of the (a1) to (a5) and applies the combined transformations sequentially, wherein the first to the third features in each of the transformations (a1) to (a5) are variably set in each of the transformations.

7. The feature transformation apparatus according to claim 2, wherein the processor transforms the features using any one of the following transformations:

(b1) transformation that inverts a sign of a first feature;

(b2) transformation that subtracts a second feature from the first feature;

(b3) transformation that adds the second feature to the first feature and inverts a sign of the second feature;

(b4) transformation that adds the second feature to the first feature; and (b5) transformation that substitutes the addition of the first and the second features and the addition of the first feature and a third feature for the second and the third features and inverts the sign of the first feature;

or using a transformation that combines a plurality of the transformations out of the (b1) to (b5) and applies the combined transformations sequentially, wherein the first to the third features in each of the transformations (b1) to (b5) are variably set in each of the transformations.

8. The feature transformation apparatus according to claim 1, wherein the processor further performs a rounding transformation that rounds each value in the combination to 0 or 1 in addition to the transformation of the combination.

9. The feature transformation apparatus according to claim 8, wherein the processor performs one of the following as the rounding transformation:

transforming the combination by rounding a value in the combination to 0 or 1 when the value is other than 0 or 1; and transforming the combination by performing modulo 2 on a value in the combination when the value is other than 0 or 1.

10. The feature transformation apparatus according to claim 1, wherein the processor transforms the combination using a transformation that performs an exclusive-OR addition on occurrences of a first feature and occurrences of a second feature or using a transformation that combines a plurality of the exclusive-OR additions and applies the combined exclusive-OR additions sequentially.

11. The feature transformation apparatus according to claim 2, wherein the processor derives, as the feature transformation, the feature set after the transformation, based on optimization using a distance between the sum of the combination after the transformation with respect to the feature set after the transformation and the sum of the combination before the transformation with respect to the feature set before the transformation.

12. The feature transformation apparatus according to claim 1, wherein the processor acquires a transformation type and a parameter to determine the transformation.

13. The feature transformation apparatus according to claim 12, further comprising wherein the processor generates the transformation type and the parameter.

14. The feature transformation apparatus according to claim 13, wherein the processor determines the transformation type based on an inclusive or coprime relationship, with respect to each value of the parameter, between occurrence of a first feature and occurrence of a second feature, out of features defined by the parameter and generates the transformation type and the parameter.

15. The feature transformation apparatus according to claim 14, wherein the processor generates a product of unimodular matrices as the transformation type, and generates the parameter which is a unimodular matrix, using a random number so that the combination matrix after the transformation becomes a binary matrix with a probability higher than a predetermined value.

16. The feature transformation apparatus according to claim 13, wherein the processor calculates an objective function using the combination or both the combination and the features, and performs control to maximize or minimize the objective function by controlling the transformation of at least the combination.

17. The feature transformation apparatus according to claim 16, wherein the objective function is a matrix norm of the features expressed in a matrix form or a total sum of number of times of changes of occurrences in the combination.

18. The feature transformation apparatus according to claim 16, wherein the processor executes the transformation if the value of the objective function after the transformation improves more than before the transformation.

19. A feature transformation method by a computer, the method comprising:
- accessing a combination storage part that stores a combination with respect to a set of features, wherein data is approximately represented as a sum of the combination of the features; and
- transforming at least the combination so as not to change the sum of the combination of the set of features.

20. A non-transitory computer readable recording medium storing a program that causes a computer to execute processing comprising:
- accessing a combination storage part that stores a combination with respect to a set of features, wherein data is approximately represented as a sum of the combination of the features; and
- transforming at least the combination so as not to change the sum of the combination of the set of features.

\* \* \* \* \*